(12) United States Patent
Iwasaki et al.

(10) Patent No.: US 8,810,920 B2
(45) Date of Patent: Aug. 19, 2014

(54) LENS BARREL

(75) Inventors: Shinichi Iwasaki, Osaka (JP); Keiji Sakamoto, Yamagata (JP); Eiji Nagasaki, Osaka (JP); Kenji Sasaki, Kyoto (JP); Fumio Shinano, Osaka (JP)

(73) Assignee: Panasonic Corporation, Osaka (JP)

( * ) Notice: Subject to any disclaimer, the term of this patent is extended or adjusted under 35 U.S.C. 154(b) by 7 days.

(21) Appl. No.: 13/637,662

(22) PCT Filed: Aug. 10, 2011

(86) PCT No.: PCT/JP2011/004522
§ 371 (c)(1),
(2), (4) Date: Sep. 27, 2012

(87) PCT Pub. No.: WO2012/023264
PCT Pub. Date: Feb. 23, 2012

(65) Prior Publication Data
US 2013/0016434 A1  Jan. 17, 2013

(30) Foreign Application Priority Data
Aug. 19, 2010  (JP) ................. 2010-184481

(51) Int. Cl.
*G02B 15/14* (2006.01)
*G02B 7/02* (2006.01)
*G02B 17/00* (2006.01)

(52) U.S. Cl.
USPC .............. 359/700; 359/813; 396/72

(58) Field of Classification Search
USPC ......... 359/811–815, 694, 808, 822–824, 830, 359/699–701, 702–704, 819, 826–827, 359/829; 396/72, 344, 349
See application file for complete search history.

(56) References Cited

U.S. PATENT DOCUMENTS

| | | | |
|---|---|---|---|
| 7,039,308 B2 | 5/2006 | Nomura | |
| 7,339,751 B2 | 3/2008 | Eto | |
| 7,746,584 B2 | 6/2010 | Honsho et al. | |

(Continued)

FOREIGN PATENT DOCUMENTS

| | | |
|---|---|---|
| JP | 10-048501 | 2/1998 |
| JP | 2002-090611 | 3/2002 |

(Continued)

OTHER PUBLICATIONS

International Search Report of PCT Application No. PCT/JP2011/004522 dated Oct. 18, 2011.

(Continued)

*Primary Examiner* — Dawayne A Pinkney
(74) *Attorney, Agent, or Firm* — Panasonic Patent Center

(57) ABSTRACT

A lens barrel (3) comprises a drive frame (30) and a first lens frame (50). The first lens frame (50) has first to third cam followers (54*a* to 54*c*) that are respectively inserted into first to third outer cam grooves (34*a* to 34*c*), and first and second auxiliary pins (55*a* and 55*b*) disposed so as to be able to come into contact with first and second auxiliary grooves (35*a* and 35*b*). When viewed in the Y axis direction, the first and second auxiliary pins (55*a* and 55*b*) are disposed between the first to third cam followers (54*a* to 54*c*) in the peripheral direction. The positions of the first and second auxiliary pins (55*a* and 55*b*) are offset from the positions of the first to third cam followers (54*a* to 54*c*) in the Y axis direction.

10 Claims, 23 Drawing Sheets

(56) References Cited

U.S. PATENT DOCUMENTS

| | | | |
|---|---|---|---|
| 7,920,345 B2 | 4/2011 | Honsho et al. | |
| 8,023,201 B2* | 9/2011 | Oya | 359/700 |
| 8,154,809 B2 | 4/2012 | Kudoh | |
| 2004/0042089 A1 | 3/2004 | Nomura | |
| 2006/0007565 A1 | 1/2006 | Eto | |
| 2007/0092238 A1 | 4/2007 | Shirakawa | |
| 2007/0195429 A1 | 8/2007 | Kobayashi | |
| 2008/0174891 A1 | 7/2008 | Kudoh | |
| 2008/0180812 A1 | 7/2008 | Honsho et al. | |
| 2010/0142939 A1 | 6/2010 | Honsho et al. | |
| 2011/0001872 A1* | 1/2011 | Honsho et al. | 348/362 |
| 2012/0188659 A1 | 7/2012 | Kudoh | |

FOREIGN PATENT DOCUMENTS

| | | |
|---|---|---|
| JP | 2003-084185 | 3/2003 |
| JP | 2003-315660 | 11/2003 |
| JP | 2004-085932 | 3/2004 |
| JP | 2006-023604 | 1/2006 |
| JP | 2006-047703 | 2/2006 |
| JP | 2007-114530 | 5/2007 |
| JP | 2008-175921 | 7/2008 |
| JP | 2008-185786 | 8/2008 |

OTHER PUBLICATIONS

Office Action for Chinese Application No. 201180013963.X issued on Apr. 24, 2014.

* cited by examiner

LENS BARREL

TECHNICAL FIELD

The technology disclosed herein relates to a lens barrel.

BACKGROUND ART

A digital camera is an example of a known imaging device. A digital camera has a lens barrel and an imaging element. The imaging element is a CCD (Charge Coupled Device) image sensor or a CMOS (Complementary Metal Oxide Semiconductor) image sensor, for example. The imaging element converts optical images formed by the lens barrel into image signals. This allows image data about the subject to be acquired.

CITATION LIST

Patent Literature

Patent Literature 1: Japanese Laid-Open Patent Application 2003-315660

SUMMARY

A lens barrel has a plurality of frames that support the optical system. Some frames have cam members, while guide grooves are formed in other frames. The cam members are inserted into the guide grooves. When the frames rotate relative to each other, the cam members are guided by the guide grooves, and the frames move relative to each other in the optical axis direction. This configuration yields a telescoping lens barrel.

However, there is the risk that external force will be transmitted to the frames if an external force is exerted on the lens barrel, and this could damage the cam members or guide grooves.

In view of this, reinforcing projections and reinforcing grooves are provided to the frames in addition to the cam members and guide grooves. Even if an external force is exerted on the lens barrel, it can be borne by the reinforcing projections and reinforcing grooves, so damage to the cam members and guide grooves can be suppressed.

However, providing reinforcing grooves in addition to the guide grooves increases the diameter of the frames, or requires the guide grooves to be made smaller. That is, the reinforcing grooves may diminish the amount of design latitude.

The lens barrel disclosed herein comprises a substantially cylindrical first frame and a second frame. The first frame has at least three cam grooves disposed spaced apart in the peripheral direction, and at least one first side wall component disposed between adjacent cam grooves. The second frame has at least three cam followers respectively inserted into the cam grooves, and at least one protrusion disposed so as to be able to come into contact with the first side wall component. When the first frame and second frame rotate relatively, they are able to move relatively in a first direction. When viewed in the first direction, the protrusion is disposed between the cam followers in the peripheral direction. The position of the protrusion is offset from the positions of the cam followers in the first direction.

With this lens barrel, even if an external force is exerted, the protrusion will come into contact with the first side wall component, so the external force can be borne by the protrusion and the first side wall component in addition to the cam followers and cam grooves. Therefore, damage to the first frame and second frame can be suppressed.

Also, when viewed in the first direction, the protrusion is disposed between the cam followers in the peripheral direction. Furthermore, the position of the protrusion is offset from the positions of the cam followers in the first direction. Accordingly, the position of the first side wall component is offset in the first direction from the position of the cam grooves. Thus, the first side wall component and the cam grooves can be disposed more efficiently.

Because of the above, with the lens barrel disclosed herein, strength can be improved while design latitude is enhanced.

DESCRIPTION OF EMBODIMENTS

First Embodiment

Overall Configuration of Digital Camera

Figure 1:
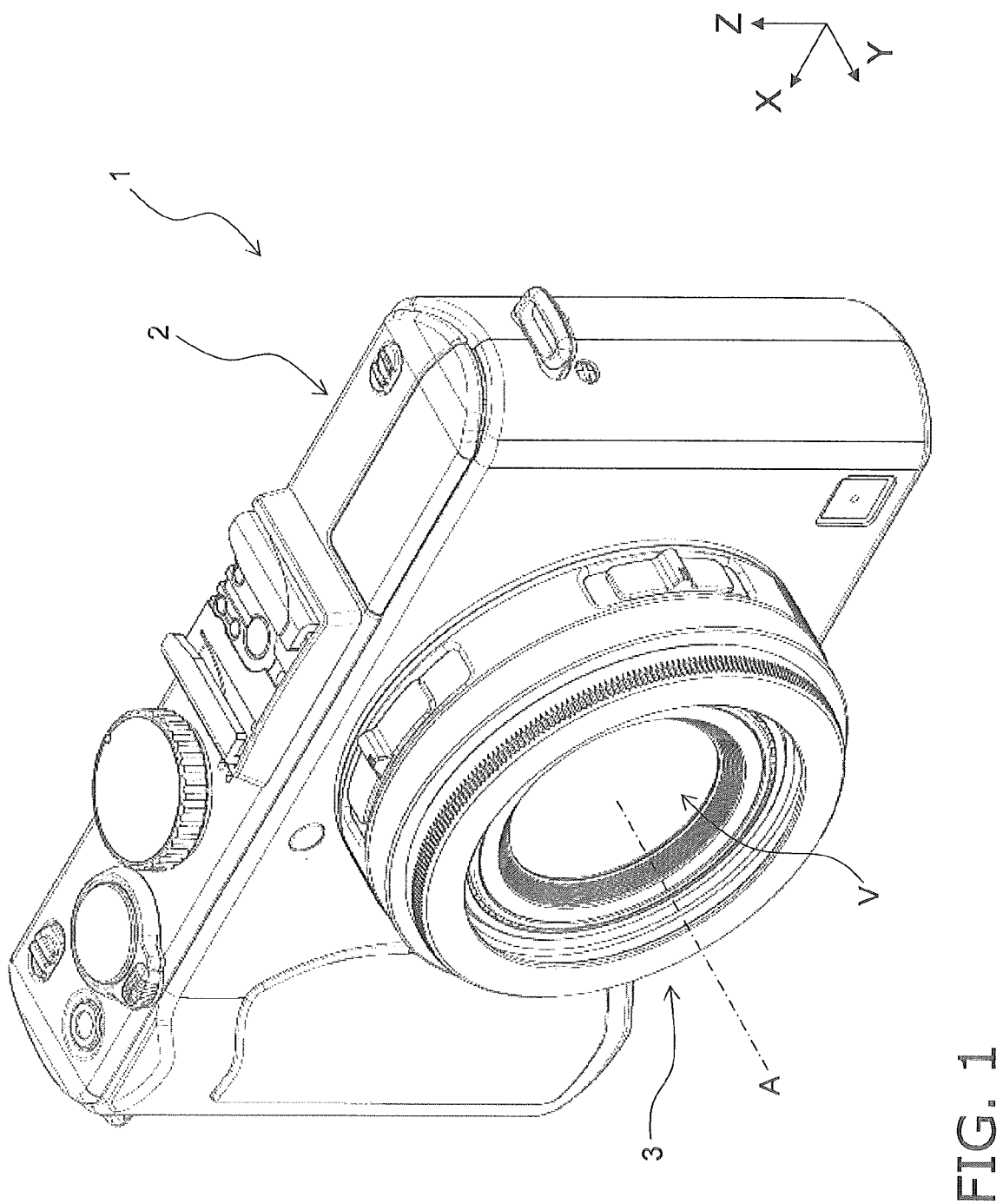
FIG. 1 is an oblique view of a digital camera.

FIG. 1 is an oblique view of a digital camera 1. As shown in FIG. 1, the digital camera 1 comprises a housing 2 and a lens barrel 3. The lens barrel 3 is fixed to the housing 2.

As shown in FIG. 1, a three-dimensional coordinate system is set up for the digital camera 1. The Y axis is set to be parallel to the optical axis A of the optical system V. The Y axis direction parallel to the Y axis is an example of a first direction.

Figure 2:
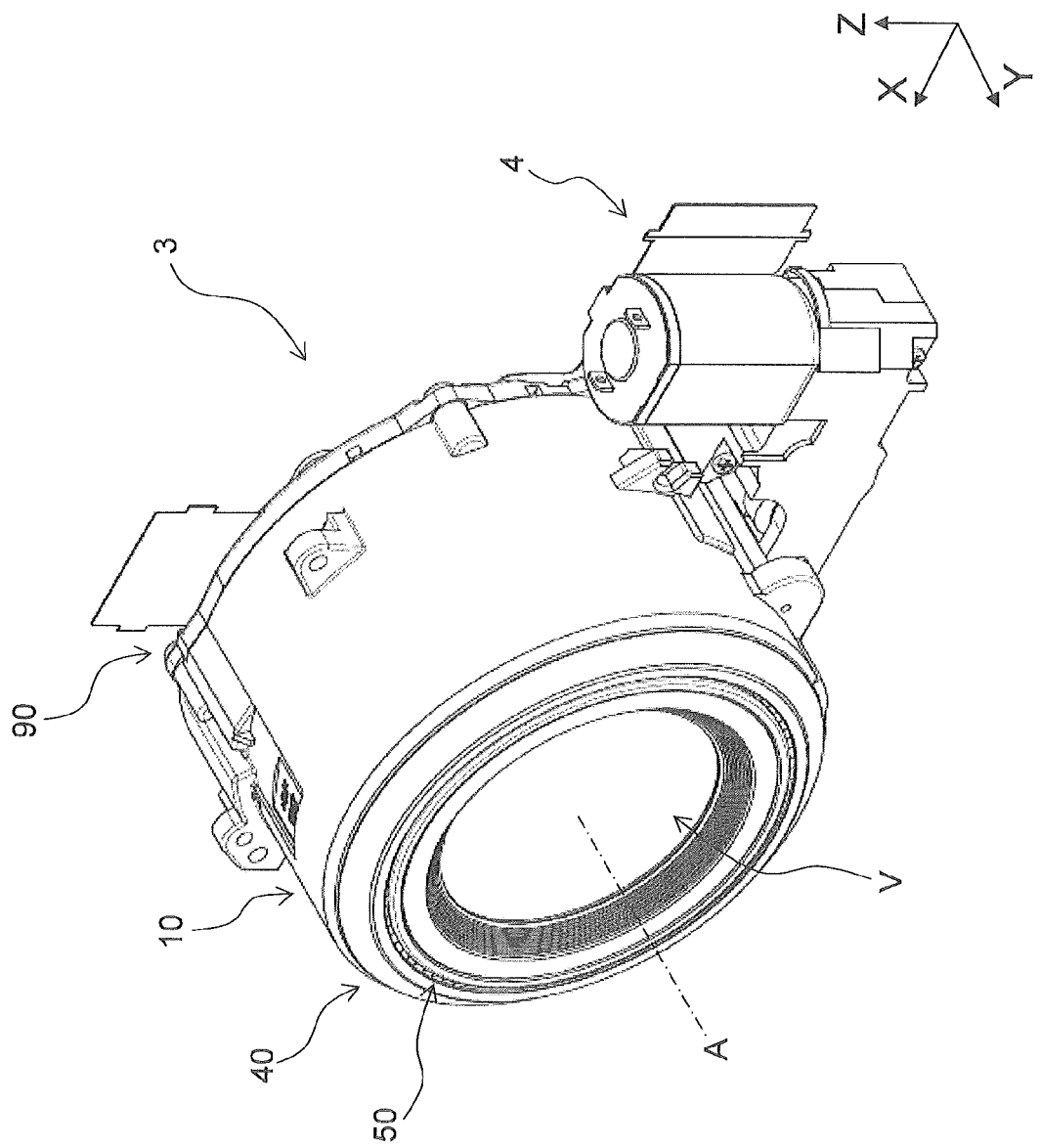
FIG. 2 is an oblique view of a lens barrel.

FIG. 2 is an oblique view of the lens barrel 3. As shown in FIG. 2, the lens barrel 3 (an example of a lens barrel) comprises the optical system V, a master flange 90, a fixed frame 10, a zoom motor 4, an intermediate frame 40, and a first lens frame 50. The fixed frame 10 is fixed to the housing 2 (see FIG. 1). The master flange 90 and the zoom motor 4 are fixed to the fixed frame 10.

Figure 3:
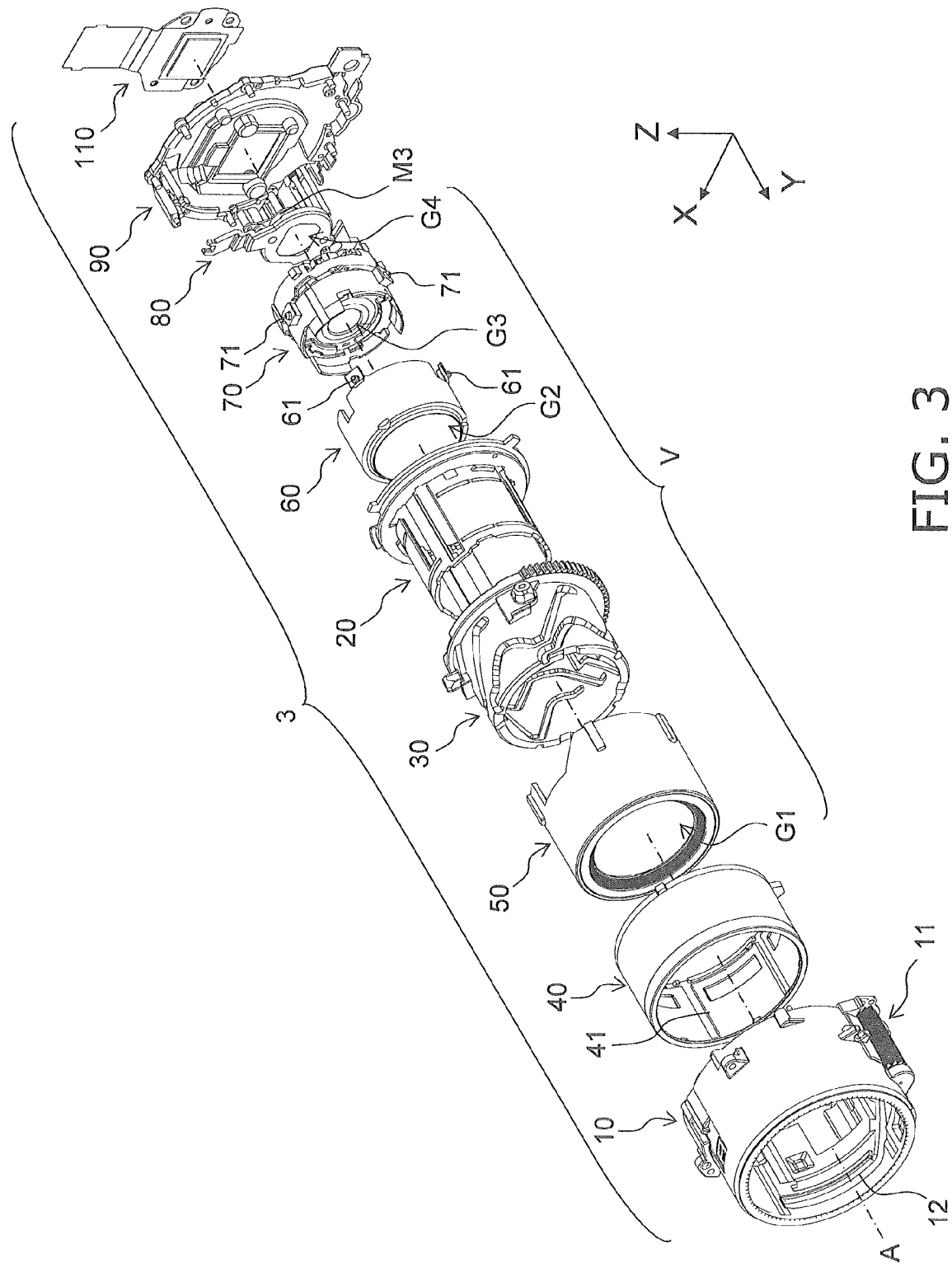
FIG. 3 is an exploded oblique view of a lens barrel.

FIG. 3 is an exploded oblique view of the lens barrel 3. As shown in FIG. 3, the lens barrel 3 further comprises a drive frame 30, a rectilinear frame 20, a second lens frame 60, a third lens frame 70, and a fourth lens frame 80.

The optical system V has a first lens group G1, a second lens group G2, a third lens group G3, and a fourth lens group G4. The first lens group G1, second lens group G2, third lens group G3, and fourth lens group G4 define the optical axis A.

The first lens group G1 is fixed to the first lens frame 50. The second lens group G2 is fixed to the second lens frame 60. The third lens group G3 is supported by the third lens frame 70. The fourth lens group G4 is used for focal adjustment, and is fixed to the fourth lens frame 80.

The drive frame 30 is rotatably supported by the fixed frame 10. The drive frame 30 is rotationally driven by the zoom motor 4 (see FIG. 2). When the drive frame 30 rotates with respect to the fixed frame 10, the drive frame 30 moves in the Y axis direction with respect to the fixed frame 10. The drive frame 30 drives the first lens frame 50, the second lens frame 60, and the third lens frame 70 in the Y axis direction. The drive frame 30 will be discussed in detail below.

The first lens frame 50 supports the first lens group G1, and is guided in the Y axis direction by cam grooves of the drive frame 30. The rotation of the first lens frame 50 with respect to the fixed frame 10 is restricted by the intermediate frame 40. When the drive frame 30 rotates with respect to the fixed frame 10, the first lens frame 50 moves in the Y axis direction without rotating with respect to the fixed frame 10. The first lens frame 50 will be discussed in detail below.

The intermediate frame 40 is supported by the fixed frame 10 so as to be movable in the Y axis direction, and restricts the rotation of the first lens frame 50 with respect to the fixed frame 10.

The rectilinear frame 20 is supported by the fixed frame 10 so as to be movable in the Y axis direction. The rotation of the rectilinear frame 20 with respect to the fixed frame 10 is restricted by the fixed frame 10. Also, the rectilinear frame 20 is rotatably supported by the drive frame 30. The rectilinear frame 20 is provided so as to be movable together with the drive frame 30 in the Y axis direction. The rectilinear frame 20 restricts the rotation of the third lens frame 70 with respect to the fixed frame 10.

The second lens frame 60 supports the second lens group G2 and is guided in the Y axis direction by the cam grooves of the drive frame 30. The rotation of the second lens frame 60 with respect to the fixed frame 10 is restricted by the rectilinear frame 20. When the drive frame 30 rotates with respect to the fixed frame 10, the second lens frame 60 moves in the Y axis direction without rotating with respect to the fixed frame 10.

The third lens frame 70 supports the third lens group G3 and is guided in the Y axis direction by the cam grooves of the drive frame 30. The third lens frame 70 has a built-in aperture unit and shutter unit (not shown). The rotation of the third lens frame 70 with respect to the fixed frame 10 is restricted by the rectilinear frame 20. When the drive frame 30 rotates with respect to the fixed frame 10, the third lens frame 70 moves in the Y axis direction without rotating with respect to the fixed frame 10.

The fourth lens frame 80 supports the fourth lens group G4, and is supported by the master flange 90 so as to be movable in the Y axis direction with respect to the master flange 90. The fourth lens frame 80 is driven in the Y axis direction by a focus motor M3 fixed to the master flange 90.

An image sensor unit 110 is fixed to the master flange 90.

Configuration of Drive Frame 30

The configuration of the drive frame 30 will now be described in detail.

Figure 4:
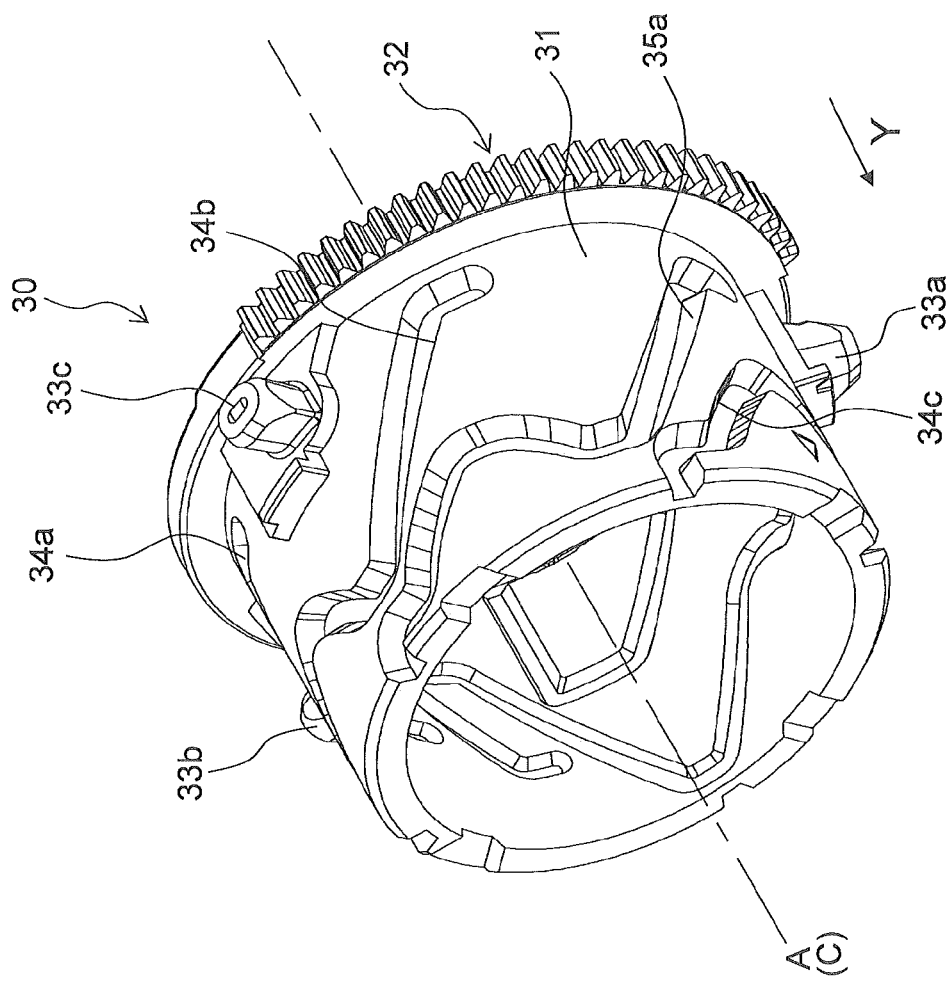
FIG. 4 is an oblique view of a drive frame.

FIG. 4 is an oblique view of the drive frame 30. As shown in FIG. 4, the drive frame 30 is a substantially cylindrical portion, and extends in the Y axis direction (an example of a first direction). The drive frame 30 has a drive frame main body 31, a gear component 32, first to third drive cam followers 33a to 33c, first to third outer cam grooves 34a to 34c, and first and second auxiliary grooves 35a and 35b (see FIG. 5A).

The drive frame main body 31 is a substantially cylindrical portion, and extends in the Y axis direction. The center line C of the drive frame main body 31 is parallel to the Y axis direction. In this embodiment, the center line C coincides with the optical axis A.

The gear component 32 is formed at one end of the drive frame main body 31 that is on a negative side of the Y axis direction, and is disposed on the outer peripheral face of the drive frame main body 31. The gear component 32 meshes with a drive gear 11 (see FIG. 3), and the drive frame main body 31 is driven to be rotated with respect to the fixed frame 10 by the zoom motor 4 via the drive gear 11.

The first to third drive cam followers 33a to 33c protrude outward in the radial direction from the drive frame main body 31, and are inserted into three cam grooves 12 (see FIG. 3) formed on the inner peripheral side of the fixed frame 10. When the drive frame main body 31 is driven to be rotated with respect to the fixed frame 10 by the zoom motor 4, the first to third drive cam followers 33a to 33c are guided by the cam grooves 12. The drive frame 30 moves in the Y axis direction while rotating with respect to the fixed frame 10, or rotates with respect to the fixed frame 10 without moving in the Y axis direction, according to the shape of the cam grooves 12.

The first to third outer cam grooves 34a to 34c (an example of cam grooves) are formed in the outer peripheral face of the drive frame main body 31, and are disposed spaced apart in the peripheral direction. The first to third outer cam grooves 34a to 34c all have the same shape. The positions of the first to third outer cam grooves 34a to 34c in the Y axis direction are mutually the same. In this embodiment, the first to third outer cam grooves 34a to 34c are not disposed equidistantly spaced in the peripheral direction. A first cam follower 54a (see FIGS. 10A and 10B) of the first lens frame 50 is inserted into the first outer cam groove 34a. A second cam follower 54b (see FIGS. 10A and 10B) of the first lens frame 50 is inserted into the second outer cam groove 34b. A third cam follower 54c (see FIGS. 10A and 10B) of the first lens frame 50 is inserted into the third outer cam groove 34c.

Figure 5:
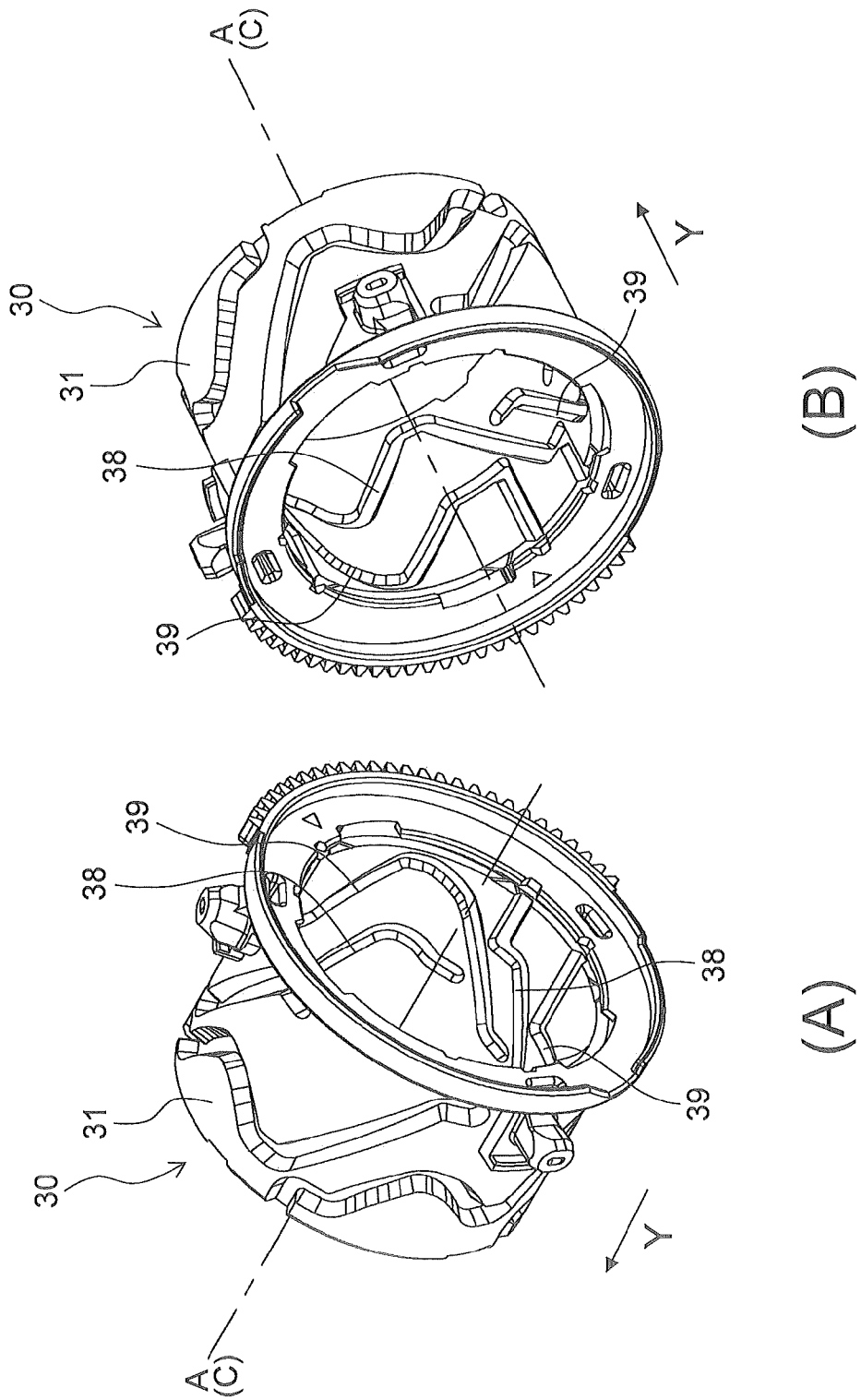
FIG. 5A is an oblique view of a drive frame.
FIG. 5B is an oblique view of a drive frame.

FIGS. 5A and 5B are oblique views of the drive frame 30. As shown in FIGS. 5A and 5B, the drive frame 30 further has three first inner cam grooves 38 and three second inner cam grooves 39. The first inner cam grooves 38 are used to guide the second lens frame 60, and are formed in the inner peripheral face of the drive frame main body 31. Cam pins 61 of the second lens frame 60 (see FIG. 3) are inserted into the first inner cam grooves 38.

The second inner cam grooves 39 are used to guide the third lens frame 70, and are formed in the inner peripheral face of the drive frame main body 31. Cam pins 71 of the third lens frame 70 (see FIG. 3) are inserted into the second inner cam grooves 39.

Figure 6:
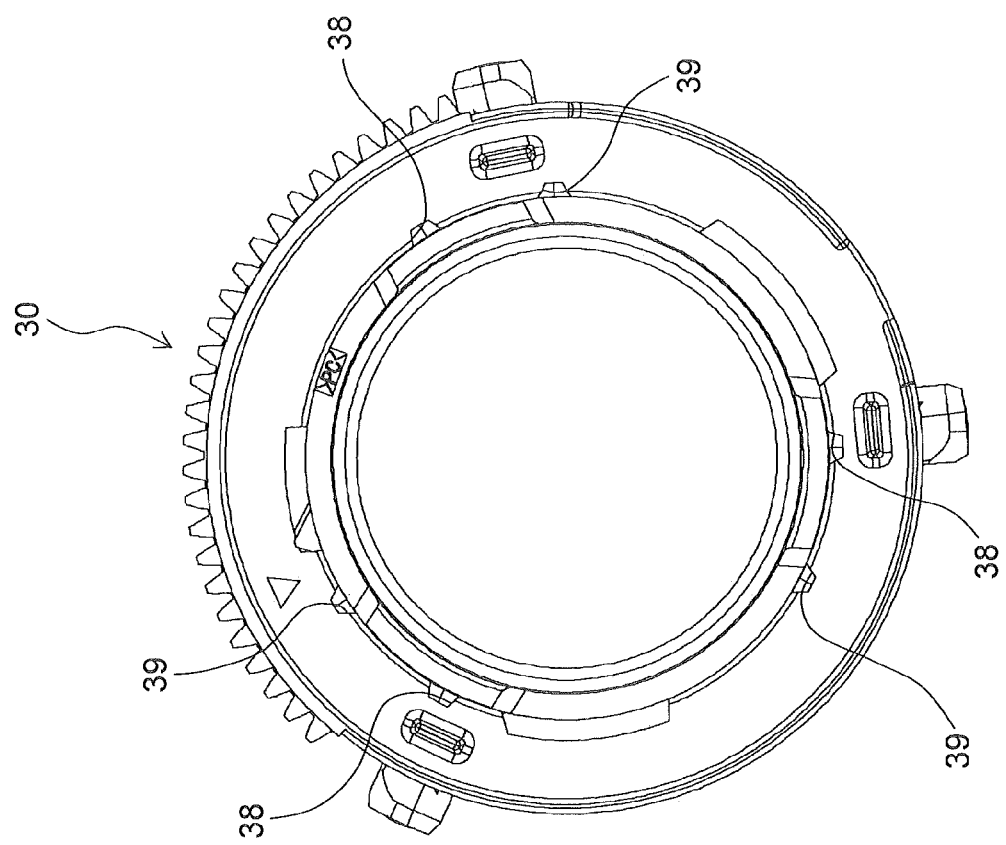
FIG. 6 is a plan view of a drive frame.

FIG. 6 is a plan view of the drive frame 30. As shown in FIG. 6, the three first inner cam grooves 38 are disposed equidistantly spaced in the peripheral direction. The three second inner cam grooves 39 are also disposed equidistantly spaced in the peripheral direction.

Figure 7:
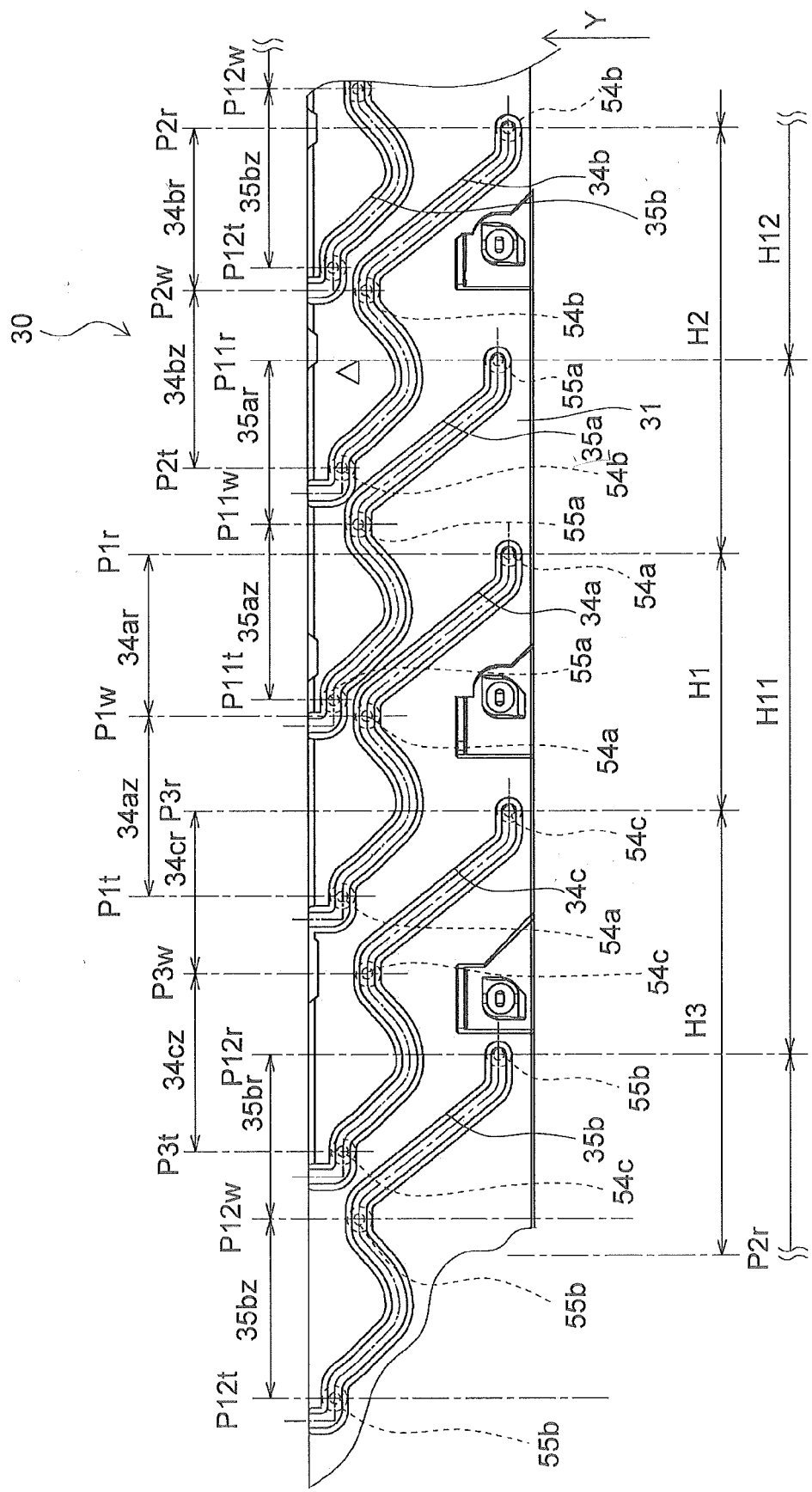
FIG. 7 is a development view of the outer peripheral face of a drive frame (a development view as seen from the inner peripheral side)

FIG. 7 is a development view of the outer peripheral face of the drive frame 30. FIG. 7 shows a development view of the outer peripheral face as seen from the inner peripheral side. As shown in FIG. 7, the first outer cam groove 34a has a first recess 34ar and a first zoom component 34az.

The first recess 34ar is used when changing the state of the lens barrel 3 from a recessed state to an imaging commencement state, or from an imaging commencement state to a recessed state. Assuming that the position at which the first cam follower 54a is disposed within the first outer cam groove 34a in the recessed state is defined as the first recessed position P1r, and the position at which the first cam follower 54a is disposed within the first outer cam groove 34a at the wide angle end is defined as the first wide angle position P1w (an example of a wide angle position), the first recess 34ar corresponds to a region extending from the first recessed position P1r to the first wide angle position P1w.

The first zoom component 34az is used when changing the state of the lens barrel 3 from an imaging commencement state (the wide angle end in this embodiment) to the telephoto end, or from the telephoto end to the wide angle end. Assuming that the position at which the first cam follower 54a is disposed within the first outer cam groove 34a at the telephoto end is defined as the first telephoto position P1t (an example of a telephoto position), the first zoom component 34az corresponds to a region extending from the first wide angle position P1w to the first telephoto position P1t.

In this embodiment, the first recessed position P1r, the first wide angle position P1w, and the first telephoto position P1t are determined using the center axis of the first cam follower 54a as a reference.

Just as with the first outer cam groove 34a, the second outer cam groove 34b has a second recess 34br and a second zoom component 34bz.

The second recess 34br corresponds to the first recess 34ar of the first outer cam groove 34a. A second recessed position P2r in the second outer cam groove 34b corresponds to the first recessed position P1r in the first outer cam groove 34a. A second wide angle position P2w in the second outer cam groove 34b (an example of a wide angle position) corresponds to the first wide angle position P1w in the first outer cam groove 34a.

The second zoom component 34bz corresponds to the first zoom component 34az of the first outer cam groove 34a. A second telephoto position P2t in the second outer cam groove 34b (an example of a telephoto position) corresponds to the first telephoto position P1t in the first outer cam groove 34a.

In this embodiment, the second recessed position P2r, the second wide angle position P2w, and the second telephoto position P2t are determined using the center axis of the second cam follower 54b as a reference.

Just as with the first outer cam groove 34a, the third outer cam groove 34c has a third recess 34cr and a third zoom component 34cz.

The third recess 34cr corresponds to the first recess 34ar of the first outer cam groove 34a. A third recessed position P3r in the third outer cam groove 34c corresponds to the first recessed position P1r in the first outer cam groove 34a. A third wide angle position P3w in the third outer cam groove 34c (an example of a wide angle position) corresponds to the first wide angle position P1w in the first outer cam groove 34a.

The third zoom component 34cz corresponds to the first zoom component 34az of the first outer cam groove 34a. A third telephoto position P3t in the third outer cam groove 34c (an example of a telephoto position) corresponds to the first telephoto position P1t in the first outer cam groove 34a.

In this embodiment, the third recessed position P3r, the third wide angle position P3w, and the third telephoto position P3t are determined using the center axis of the third cam follower 54c as a reference.

The first to third outer cam grooves 34a to 34c all have the same shape, but are disposed unevenly spaced apart in the peripheral direction. More specifically, the spacing H1 between the first outer cam groove 34a and the third outer cam groove 34c is less than the spacing H2 between the first outer cam groove 34a and the second outer cam groove 34b, and is also less than the spacing H3 between the second outer cam groove 34b and the third outer cam groove 34c. The spacings H1, H2, and H3 are all different from one another, which satisfies H1<H2<H3. The spacings H1, H2, and H3 are determined using the first recessed position P1r, the second recessed position P2r, and the third recessed position P3r as references.

The first and second auxiliary grooves 35a and 35b (an example of auxiliary grooves) are formed in the outer peripheral face of the drive frame main body 31. In this embodiment, the first and second auxiliary grooves 35a and 35b all have the same shape. The positions of the first and second auxiliary grooves 35a and 35b in the Y axis direction are mutually the same. The first and second auxiliary grooves 35a and 35b are disposed spaced apart in the peripheral direction. The first and second auxiliary grooves 35a and 35b are not disposed equidistantly spaced in the peripheral direction. The first auxiliary groove 35a is disposed between the first outer cam groove 34a and second outer cam groove 34b in the peripheral direction. The second auxiliary groove 35b is disposed between the second outer cam groove 34b and third outer cam groove 34c in the peripheral direction. A first auxiliary pin 55a (discussed below) of the first lens frame 50 is inserted into the first auxiliary groove 35a. A second auxiliary pin 55b (discussed below) of the first lens frame 50 is inserted into the second auxiliary groove 35b.

The first and second auxiliary grooves 35a and 35b have substantially the same shape as the first to third outer cam grooves 34a to 34c, but their positions in the Y axis direction (first direction) are offset from the first to third outer cam grooves 34a to 34c to the Y axis direction positive side (the deployment side, the subject side).

The first auxiliary groove 35a has a first auxiliary recess 35ar and a first auxiliary zoom component 35az. The first auxiliary recess 35ar corresponds to the first recess 34ar of the first outer cam groove 34a, and has substantially the same shape as the first recess 34ar. The first auxiliary zoom component 35az corresponds to the first zoom component 34az of the first outer cam groove 34a, and has substantially the same shape as the first zoom component 34az.

The first auxiliary recess 35ar is formed in the region in which the first auxiliary pin 55a moves when changing the state of the lens barrel 3 from a recessed state to an imaging commencement state, or from an imaging commencement state to a recessed state. Assuming that the position at which the first auxiliary pin 55a is disposed within the first auxiliary groove 35a in the recessed state is defined as the first auxiliary recessed position P11r, and the position at which the first auxiliary pin 55a is disposed within the first auxiliary groove 35a at the wide angle end is defined as the first auxiliary wide angle position P11w, then the first auxiliary recess 35ar corresponds to a region extending from the first auxiliary recessed position P11r to the first auxiliary wide angle position P11w.

The first auxiliary zoom component 35az is used when changing the state of the lens barrel 3 from an imaging commencement state (the wide angle end in this embodiment) to the telephoto end, or from the telephoto end to the wide angle end. Assuming that the position at which the first auxiliary pin 55a is disposed within the first auxiliary groove 35a at the telephoto angle end is defined as the first auxiliary telephoto position P11t, then the first auxiliary zoom component 35az corresponds to a region extending from the first auxiliary wide angle position P11w to the first auxiliary telephoto position P11t.

In this embodiment, the first auxiliary recessed position P11r, the first auxiliary wide angle position P11w, and the first auxiliary telephoto position P11t are determined using the center axis of the first auxiliary pin 55a as references.

Just as with the first auxiliary groove 35a, the second auxiliary groove 35b has a second auxiliary recess 35br and a second auxiliary zoom component 35bz. The second auxiliary recess 35br corresponds to the first auxiliary recess 35ar of the first auxiliary groove 35a. The second auxiliary zoom component 35bz corresponds to the first auxiliary zoom component 35az of the first auxiliary groove 35a. A second auxiliary recessed position P12r in the second auxiliary groove 35b corresponds to the first auxiliary recessed position P11r in the first auxiliary groove 35a. A second auxiliary wide angle position P12w in the second auxiliary groove 35b corresponds to the first auxiliary recessed position P11r in the first auxiliary groove 35a. A second auxiliary telephoto position P12t in the second auxiliary groove 35b corresponds to the first auxiliary telephoto position P11t in the first auxiliary groove 35a.

In this embodiment, the second auxiliary recessed position P12r, the second auxiliary wide angle position P12w, and the second auxiliary telephoto position P12t are determined using the center axis of the second auxiliary pin 55b as a reference.

The first and second auxiliary grooves 35a and 35b both have the same shape, but are disposed unevenly spaced apart in the peripheral direction. More specifically, the spacings H11 and H12 between the first auxiliary groove 35a and the second auxiliary groove 35b are different, which satisfies H11<H12. The spacings H11 and H12 are determined using the first auxiliary recessed position P11r and the second auxiliary recessed position P12r as references.

Also, in this embodiment, the number of cam grooves (the first to third outer cam grooves 34a to 34c) is three, while the number of auxiliary grooves (the first and second auxiliary grooves 35a and 35b) is two. That is, the number of auxiliary grooves is less than the number of cam grooves. Also, five grooves are provided to the outer peripheral face of the drive frame 30 as cam grooves, auxiliary grooves, or other such grooves. In other words, in this embodiment there are only five grooves which are formed in the outer peripheral face of the drive frame 30 and into which projections are inserted.

Figure 8:
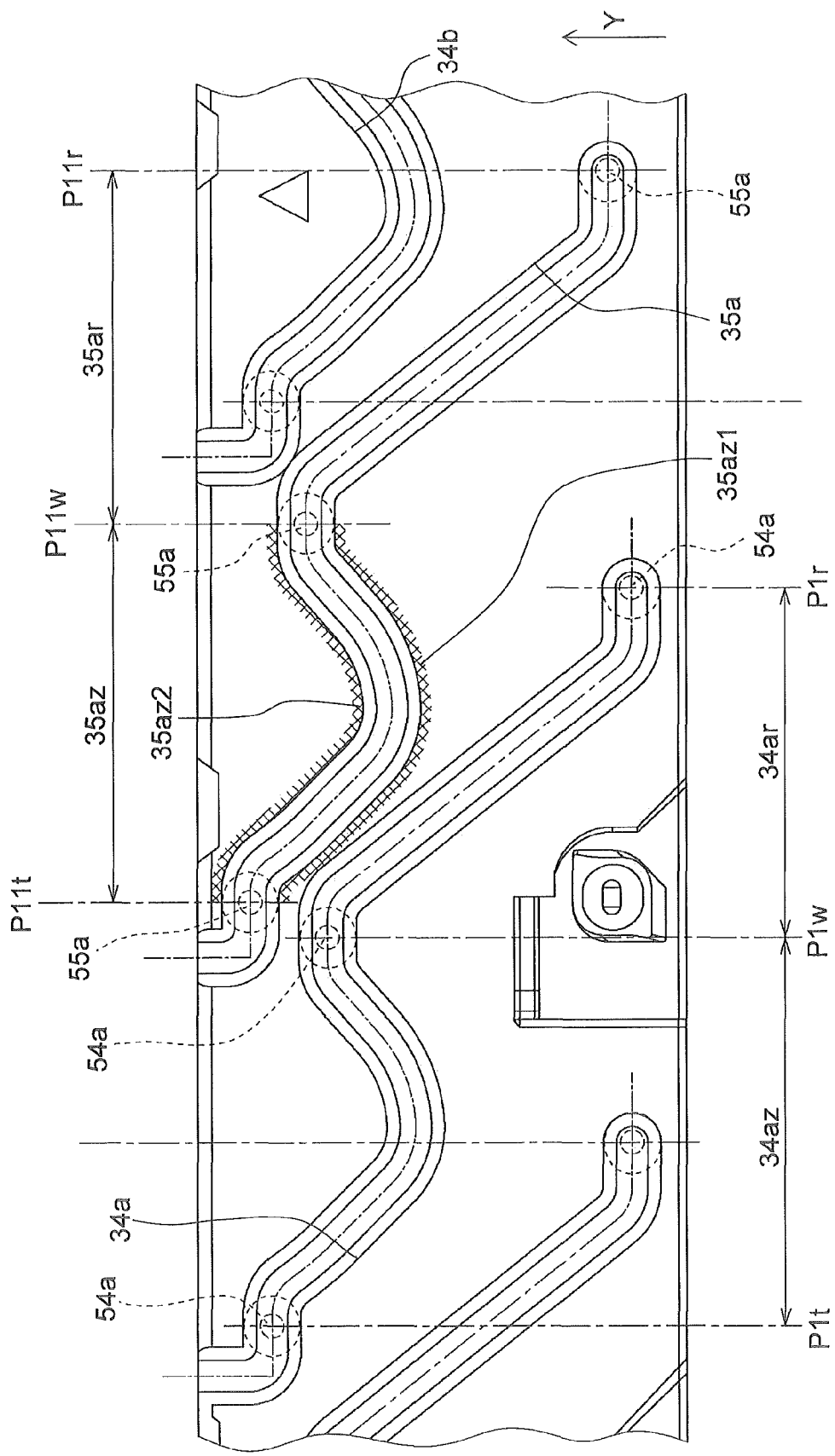
FIG. 8 is a detail enlargement of FIG. 7.

FIG. 8 is a detail enlargement of FIG. 7. As shown in FIG. 8, the first auxiliary zoom component 35az has a first rear side wall component 35az1 and a first front side wall component 35az2. The first rear side wall component 35az1 and the first front side wall component 35az2 form part of the side walls of the first auxiliary groove 35a. In a state in which the first cam follower 54a is inserted into the first zoom component 34az, the first auxiliary pin 55a is inserted between the first rear side wall component 35az1 and the first front side wall component 35az2. In a state in which the first cam follower 54a is inserted into the first zoom component 34az, the first rear side wall component 35az1 (an example of a first side wall component) is disposed on the Y axis direction negative side (the opposite side from the subject) with respect to the first auxiliary pin 55a. It could also be said that the first rear side wall component 35az1 is disposed on the side on which the first lens frame 50 is pulled into the drive frame 30 with respect to the first auxiliary pin 55a.

The first front side wall component 35az2 (an example of a second side wall component) is disposed opposite the first rear side wall component 35az1. In a state in which the first cam follower 54a is inserted into the first zoom component 34az, the first front side wall component 35az2 is disposed on the Y axis direction positive side (subject side) with respect to the first auxiliary pin 55a.

The first auxiliary zoom component 35az is formed along the movement path traced by the first auxiliary pin 55a when the first cam follower 54a is guided by the first zoom component 34az from the first telephoto position P1t to the first wide angle position P1w.

More precisely, the first rear side wall component 35az1 and the first front side wall component 35az2 are formed along the movement path traced by the first auxiliary pin 55a when the first cam follower 54a is guided by the first zoom component 34az from the first telephoto position P1t to the first wide angle position P1w.

Figure 9:
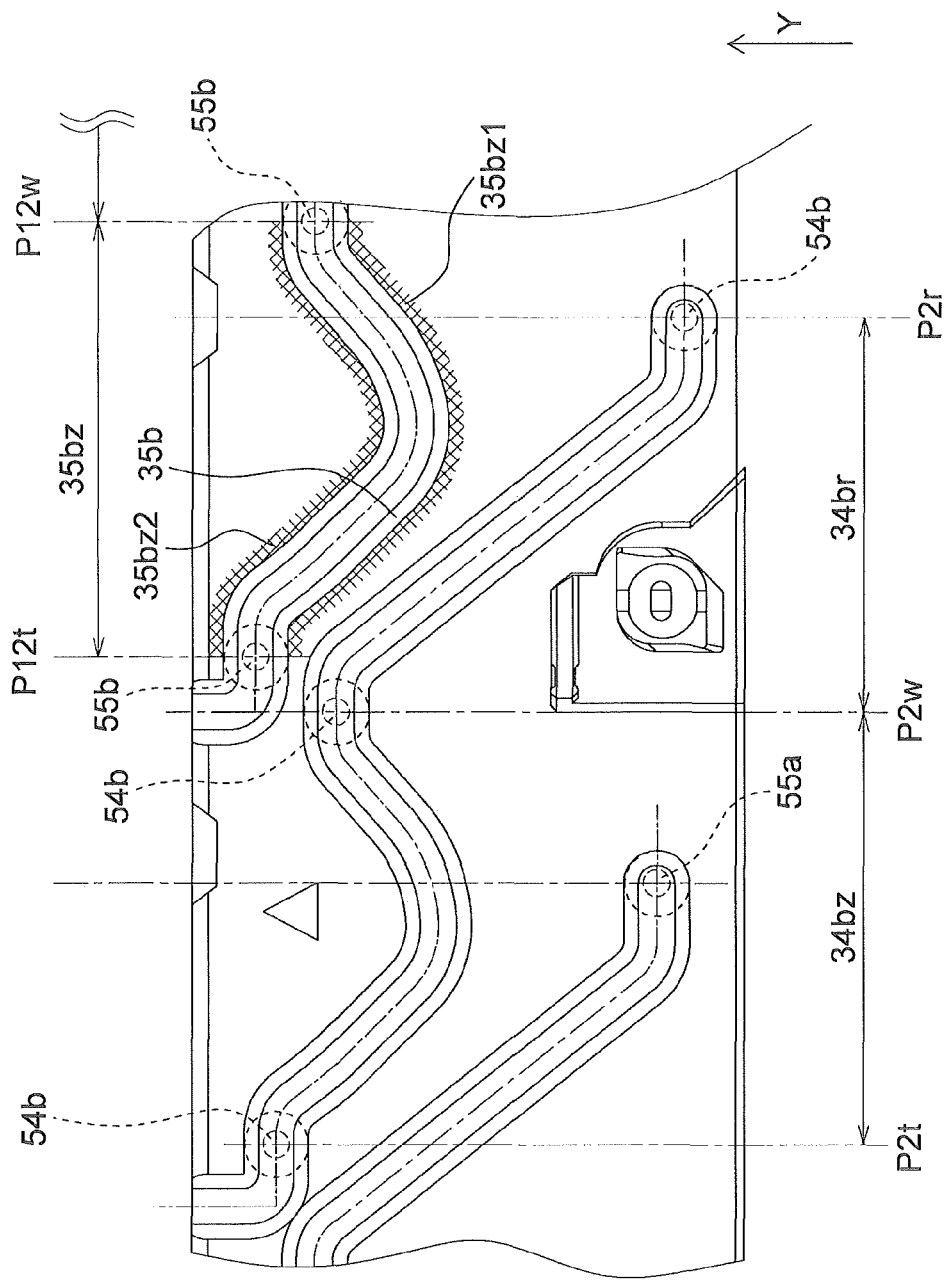
FIG. 9 is a detail enlargement of FIG. 7.

FIG. 9 is a detail enlargement of FIG. 7. As shown in FIG. 9, the second auxiliary zoom component 35bz has a second rear side wall component 35bz1 and a second front side wall component 35bz2. The second rear side wall component 35bz1 and the second front side wall component 35bz2 form part of the side walls of the second auxiliary groove 35b. The second rear side wall component 35bz1 corresponds to the first rear side wall component 35az1 of the first auxiliary zoom component 35az. The second front side wall component 35bz2 corresponds to the first front side wall component 35az2 of the first auxiliary zoom component 35az.

Configuration of First Lens Frame 50

The first lens frame 50 will be described in detail through reference to FIGS. 10A and 10B.

Figure 10:
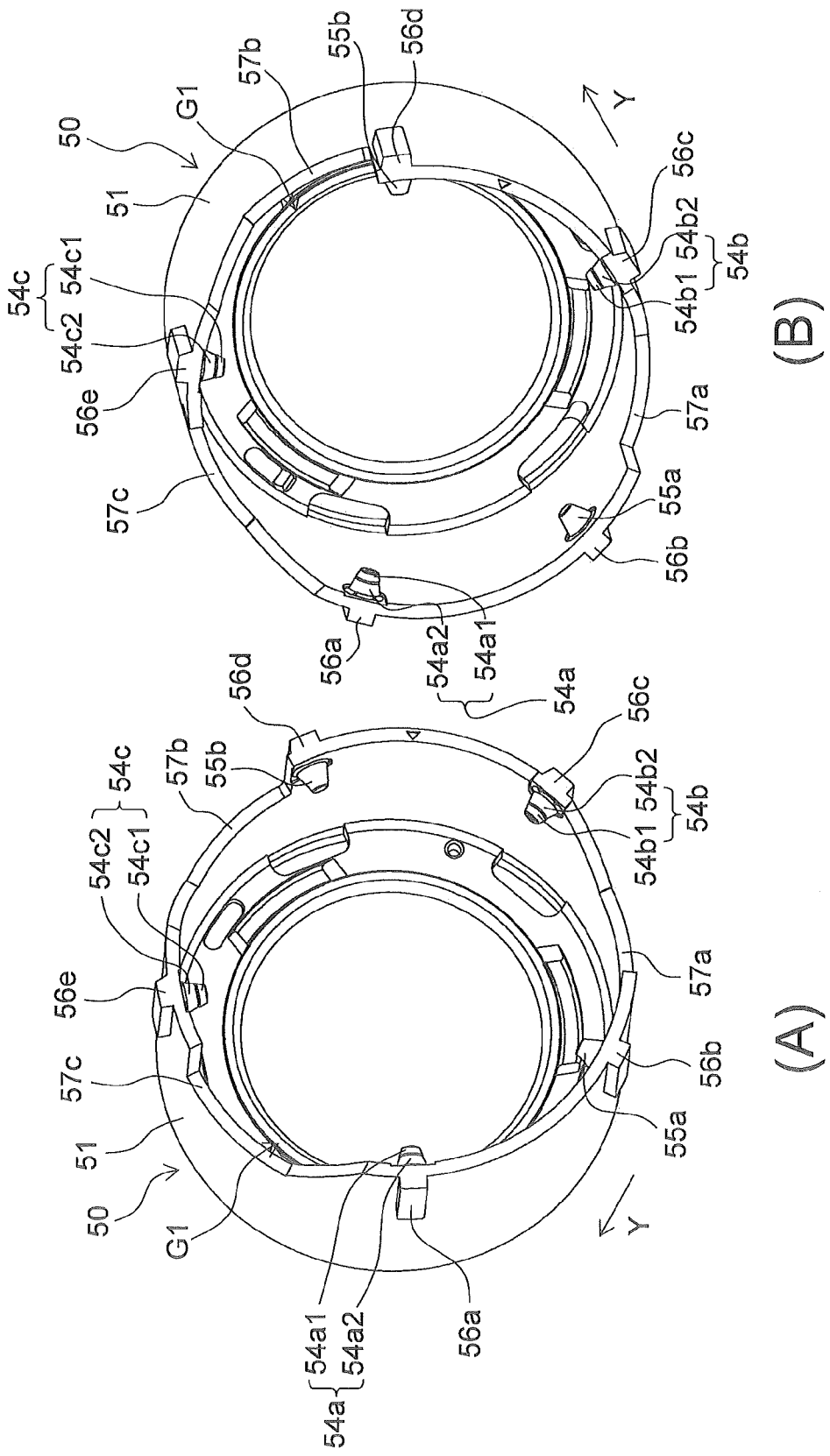
FIG. 10A is an oblique view of a first lens frame.
FIG. 10B is an oblique view of a first lens frame.

FIGS. 10A and 10B are oblique views of the first lens frame 50. As shown in FIGS. 10A and 10B, the first lens frame 50 (an example of a second frame) supports the first lens group G1, and has a first lens frame main body 51, first to third cam followers 54a to 54c, first and second auxiliary pins 55a and 55b, and five rectilinear projections 56a to 56e.

(1) First Lens Frame Main Body 51

The first lens frame main body 51 is a substantially cylindrical portion. The first lens group G1 is fixed to the end of the first lens frame main body 51 on the Y axis direction positive side. When the lens barrel 3 is in its recessed state, the first lens frame main body 51 is disposed on the outer peripheral side of the drive frame 30.

Three first to third cut-outs 57a to 57c are formed in the first lens frame main body 51. The first to third cut-outs 57a to 57c are provided to prevent interference between the first lens frame 50 and the first to third drive cam followers 33a to 33c of the drive frame 30. In the recessed state of the lens barrel 3, the first to third drive cam followers 33a to 33c are respectively disposed in the first to third cut-outs 57a to 57c. The first cut-out 57a is disposed between the first auxiliary pin 55a and the second cam follower 54b. The second cut-out 57b is disposed between the second auxiliary pin 55b and the third cam follower 54c in the peripheral direction. The third cut-out 57c is disposed between the third cam follower 54c and the first cam follower 54a in the peripheral direction.

(2) First to Third Cam Followers 54a to 54c and First and Second Auxiliary Pins 55a and 55b The first to third cam followers 54a to 54c are disposed on the inner peripheral side of the first lens frame main body 51, and protrude inward in the radial direction from the inner peripheral face of the first lens frame main body 51. The first to third cam followers 54a to 54c are examples of the cam followers of a second frame. The first to third cam followers 54a to 54c are disposed spaced apart in the peripheral direction. In this embodiment, the first to third cam followers 54a to 54c all have the same shape. The first cam follower 54a (an example of a first cam follower, and an example of a first projection) is inserted into the first outer cam groove 34a of the drive frame 30. The first cam follower 54a comes into slidable contact with the first outer cam groove 34a. The second cam follower 54b (an example of a second cam follower, and an example of a second projection) is inserted into the second outer cam groove 34b of the drive frame 30. The second cam follower 54b comes into slidable contact with the second outer cam groove 34b. The third cam follower 54c (an example of a third cam follower, and an example of a first projection) is inserted into the third outer cam groove 34c of the drive frame 30. The third cam follower 54c comes into slidable contact with the third outer cam groove 34c. The first to third outer cam grooves 34a to 34c and the first to third cam followers 54a to 54c position the first lens frame 50 in the Y axis direction, the peripheral direction, and the radial direction with respect to the drive frame 30.

The first cam follower 54a has a first sliding part 54a1 and a first base part 54a2. The second cam follower 54b has a second sliding part 54b1 and a second base part 54b2. The third cam follower 54c has a third sliding part 54c1 and a third base part 54c2. The first sliding part 54a1 slides over the first outer cam groove 34a, but the first base part 54a2 does not slide over the first outer cam groove 34a. The second sliding part 54b1 slides over the second outer cam groove 34b, but the second base part 54b2 does not slide over the second outer cam groove 34b. The third sliding part 54c1 slides over the third outer cam groove 34c, but the third base part 54c2 does not slide over the third outer cam groove 34c.

The first and second auxiliary pins 55a and 55b are disposed on the inner peripheral side of the first lens frame main body 51, and protrude inward in the radial direction from the inner peripheral face of the first lens frame main body 51. The first and second auxiliary pins 55a and 55b are examples of protrusions on a second frame. The first and second auxiliary pins 55a and 55b are disposed spaced apart in the peripheral direction. In this embodiment, the first and second auxiliary pins 55a and 55b both have the same shape.

The first auxiliary pin 55a (an example of a first protrusion, and an example of a third projection) is inserted into the first auxiliary groove 35a of the drive frame 30. In this embodiment, the first auxiliary pin 55a does not touch the first auxiliary groove 35a, and is disposed slidably over the first auxiliary groove 35a. More precisely, the first auxiliary pin 55a is disposed slidably over the first rear side wall component 35az1. A tiny space is left between the first auxiliary pin 55a and the first auxiliary groove 35a. When the lens barrel 3 is in between the wide angle end and the telephoto end, the first auxiliary pin 55a is disposed adjacent to the first rear side wall component 35az1.

The second auxiliary pin 55b (an example of a second protrusion, and an example of a third projection) is inserted into the second auxiliary groove 35b of the drive frame 30. The second auxiliary pin 55b corresponds to the first auxiliary pin 55a.

Whereas the number of cam followers (the first to third cam followers 54a to 54c) is three, the number of auxiliary pins (the first and second auxiliary pins 55a and 55b) is two. That is, the number of auxiliary pins is less than the number of cam followers. Also, five projections, such as the cam followers and auxiliary pins, are provided to the inner peripheral face of the first lens frame 50. In other words, in this embodiment the number of projections formed on the inner peripheral face of the first lens frame 50 and inserted into the grooves of the drive frame 30 is only five.

Figure 11:
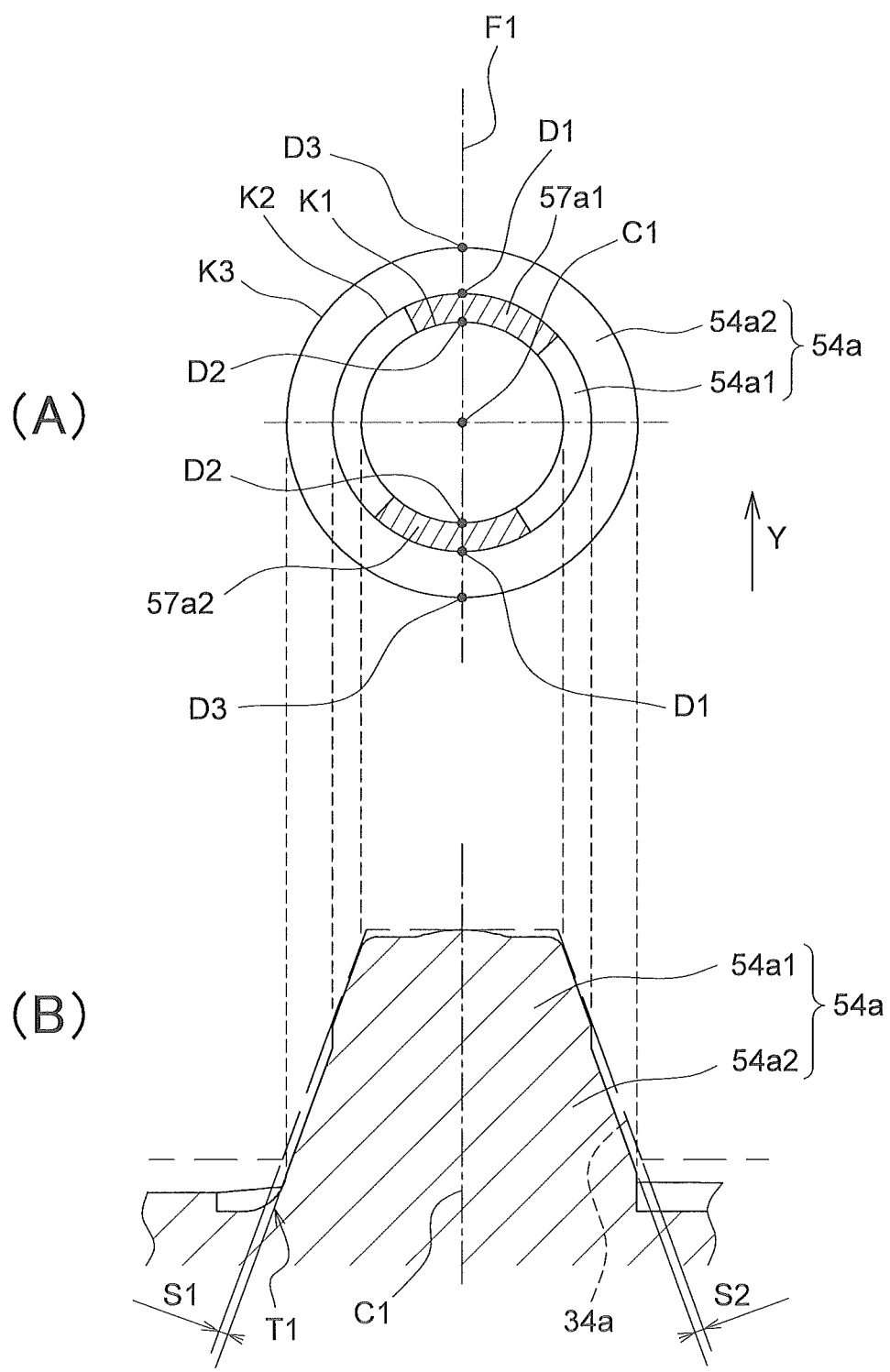
FIG. 11A is a plan view of a first cam follower.
FIG. 11B is a cross section of a first cam follower.

FIG. 11A is a plan view of the first cam follower 54a. As shown in FIG. 11A, the first cam follower 54a has sliding faces 57a1 and 57a2. The sliding faces 57a1 and 57a2 are faces capable of sliding over the first outer cam groove 34a, and constitute part of the outer peripheral face of the first sliding part 54a1. The sliding face 57a1 is disposed on the Y axis direction positive side (subject side) with respect to the center axis C1 of the first cam follower 54a. The sliding face 57a2 is disposed on the Y axis direction negative side (the opposite side from the subject) with respect to the center axis C1 of the first cam follower 54a.

Here, a first boundary K1, a second boundary K2, and a third boundary K3 are defined with respect to the first cam follower 54a. When viewed in a direction parallel to the center axis C1, the first boundary K1 is defined as a circle along the inner periphery of the first sliding part 54a1. That is, the first boundary K1 can be determined on the basis of the range over which the first cam follower 54a slides over the first outer cam groove 34a. In this embodiment, the first boundary K1 includes the inner periphery of the sliding faces 57a1 and 57a2 (the arcs disposed on the center axis C1 side).

When viewed in a direction parallel to the center axis C1, the second boundary K2 is defined as a circle along the outer periphery of the first sliding part 54a1. That is, just as with the first boundary K1, the second boundary K2 can be decided on the basis of the range over which the first cam follower 54a slides over the first outer cam groove 34a. In this embodiment, the second boundary K2 includes the outer periphery of the sliding faces 57a1 and 57a2 (the arcs disposed on the opposite side from the center axis C1).

When viewed in a direction parallel to the center axis C1, the third boundary K3 is defined as a circle along the outer contour of the first cam follower.

The center axis C1 can also be defined as a line that is parallel to the radial direction of the first lens frame 50 and that passes through the drawing center (the center of a plan view of the first auxiliary pin 55a, for example) found geometrically on the basis of the plan view shown in FIG. 11A, for example. The same applies to the center axis C2 of the second cam follower 54b and the center axis C3 of the third cam follower 54c.

Also, two first reference points D1, two second reference points D2, and two third reference points D3 can be defined with respect to the first cam follower 54a. More specifically, the first reference points D1 are points included in the sliding face 57a1, and are disposed at positions farthest away from the center axis C1 of the first cam follower 54a in the Y axis direction. The first reference points D1 are disposed at positions farthest away from the center axis C1 of the first cam follower 54a in the Y axis direction.

The second reference points D2 are points included in the sliding face 57a1, and are disposed at positions closest to the center axis C1 of the first cam follower 54a in the Y axis direction. More precisely, assuming that a plane that is parallel to the Y axis direction and the center axis C1 of the first cam follower 54a and that passes through the first reference points, D1 is defined as a first reference plane F1 (an example of a reference plane), the second reference points D2 are disposed at positions closest to the center axis C1 of the first cam follower 54a out of the points included in the sliding face 57a1 and the first reference plane F1. Also, the second reference points D2 are disposed at positions closest to the center axis C1 of the first cam follower 54a out of the points included in the sliding face 57a2 and the first reference plane F1.

The third reference points D3 are points included in the outer face of the first cam follower 54a, and are disposed at positions farthest from the center axis C1 of the first cam follower 54a in the Y axis direction. More precisely, the third reference points D3 are disposed at positions farthest from the center axis C1 of the first cam follower 54a out of the points included in the outer face of the first cam follower 54a and the first reference plane F1.

FIG. 11B is a cross section of the first cam follower 54a. As shown in FIG. 11B, spaces S1 and S2 are left between the first base part 54a2 and the first outer cam groove 34a. The same applies to the second cam follower 54b and the third cam follower 54c.

If a boundary portion T1 between the first cam follower 54a and the first lens frame main body 51 is formed in a round shape, the above-mentioned third boundary K3 is defined on the inside of the portion formed in a round shape.

Figure 12:
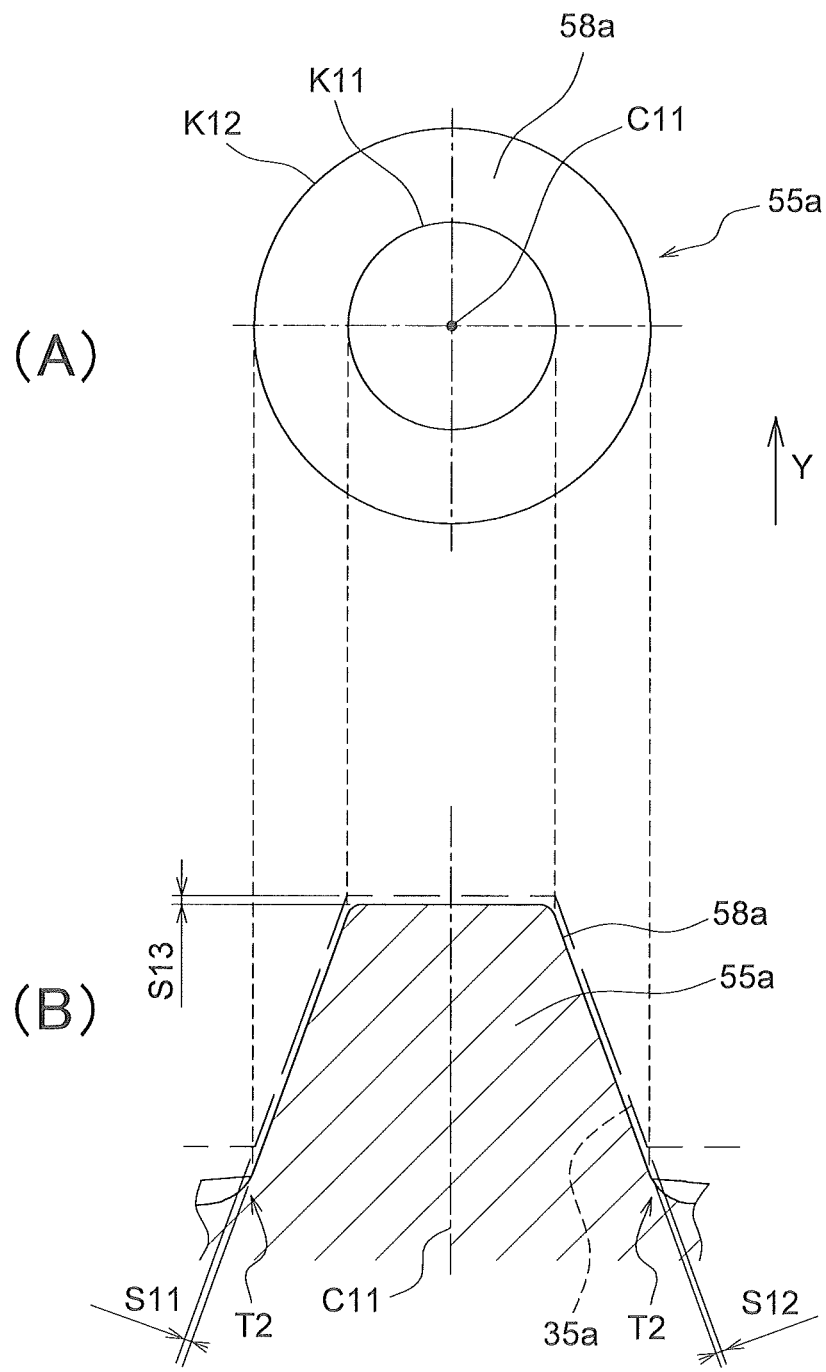
FIG. 12A is a plan view of a first auxiliary pin.
FIG. 12B is a cross section of a first auxiliary pin.

FIG. 12A is a plan view of the first auxiliary pin 55a. As shown in FIG. 12A, a first boundary K11 and a second boundary K12 are defined with respect to the first auxiliary pin 55a. When viewed in a direction parallel to the center axis C11, the first boundary K11 is defined as a circle along the inner periphery of a first tapered face 58a of the first auxiliary pin 55a. The second boundary K12 is defined as a circle along the outer periphery of the first tapered face 58a of the first auxiliary pin 55a.

Here, the center axis C11 can also be defined as a line that is parallel to the radial direction of the first lens frame 50 and that passes through the drawing center (the center of a plan view of the first auxiliary pin 55a, for example) found geometrically on the basis of the plan view shown in FIG. 12A, for example. The same applies to the center axis C12 of the second auxiliary pin 55b.

FIG. 12B is a cross section of the first auxiliary pin 55a. As shown in FIG. 12B, the first auxiliary pin 55a and the second auxiliary pin 55b basically do not touch the first auxiliary groove 35a and the second auxiliary groove 35b, and do not slide over the first auxiliary groove 35a and the second auxiliary groove 35b.

More specifically, spaces S11, S12, and S13 are left between the first auxiliary pin 55a and the first auxiliary groove 35a. Therefore, when the drive frame 30 and the first lens frame 50 rotate relatively, basically no sliding resistance is generated between the first auxiliary pin 55a and the first auxiliary groove 35a. The spaces S11 and S12 are set to sizes such that when the drive frame 30 and/or the first lens frame 50 deforms elastically, the first auxiliary pin 55a will come into contact with the first auxiliary groove 35a. Therefore, if external force is exerted on the lens barrel 3, the first auxiliary pin 55a will hit the first auxiliary groove 35a, allowing the external force to be dispersed. The same applies to the second auxiliary pin 55b and the second auxiliary groove 35b. Thus, external force can be dispersed not only by the first to third cam followers 54a to 54c, but also by the first and second auxiliary pins 55a and 55b, which suppresses damage to the drive frame 30 and the first lens frame 50.

Just as with the above-mentioned third boundary K3, if the boundary portion T2 between the first auxiliary pin 55a and the first lens frame main body 51 is formed in a round shape, the first boundary K11 is defined on the inside of the portion formed in a round shape.

Figure 13:
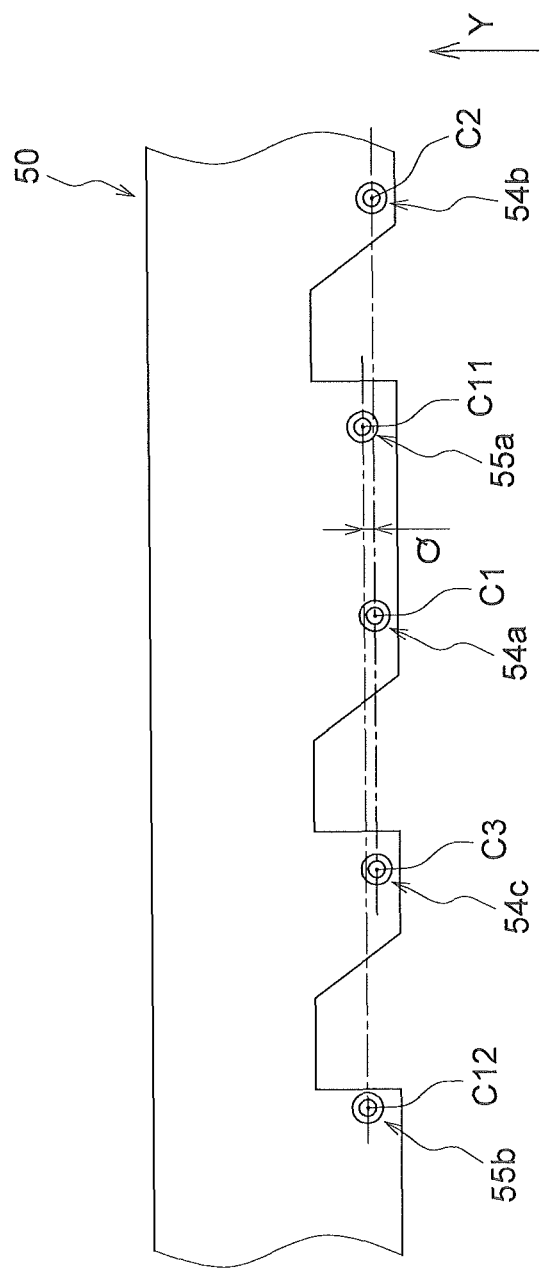
FIG. 13 is a development view of the inner peripheral face of a first lens frame.

FIG. 13 is a development view of the inner peripheral face of the first lens frame 50. As shown in FIG. 13, the positions of the first and second auxiliary pins 55a and 55b in the Y axis direction are different from the positions of the first to third cam followers 54a to 54c in the Y axis direction. More specifically, the center axis C11 and the center axis C12 of the first and second auxiliary pins 55a and 55b are offset in the Y axis direction with respect to the center axes C1 to C3 of the first to third cam followers 54a to 54c. The first and second auxiliary pins 55a and 55b are disposed more on the Y axis direction positive side (subject side) than the first to third cam followers 54a to 54c. More precisely, the center axes C11 and C12 of the first and second auxiliary pins 55a and 55b are disposed more to the Y axis direction positive side (subject side) than the center axes C1 to C3 of the first to third cam followers 54a to 54c. The Y axis direction positive side can also be called the side on which the first lens frame 50 is deployed with respect to the drive frame 30. That is, the first and second auxiliary pins 55a and 55b are disposed more on the deployment side than the first to third cam followers 54a to 54c.

Here, the configuration in which "the center axes C11 and C12 of the first and second auxiliary pins 55a and 55b are offset in the Y axis direction with respect to the first to third cam followers 54a to 54c" means, for example, that the center axes C11 and C12 of the first and second auxiliary pins 55a and 55b are offset in the Y axis direction with respect to the first to third cam followers 54a to 54c over a range that is greater than the dimensional error of the first lens frame 50. This dimensional error can be found by purchasing many of the products in question and measuring their dimensions. About ±20 μm is possible, for example, as dimensional error. In this embodiment, the offset quantity Q of the center axes C11 and C12 in the Y axis direction with respect to the center axes C1 to C3 is set to be greater than 40 μm.

The positional relation between the first to third cam followers 54a to 54c and the first and second auxiliary pins 55a and 55b will be described in further detail. Here, the layout will be described using the first cam follower 54a and the first auxiliary pin 55a as examples.

Figure 14:
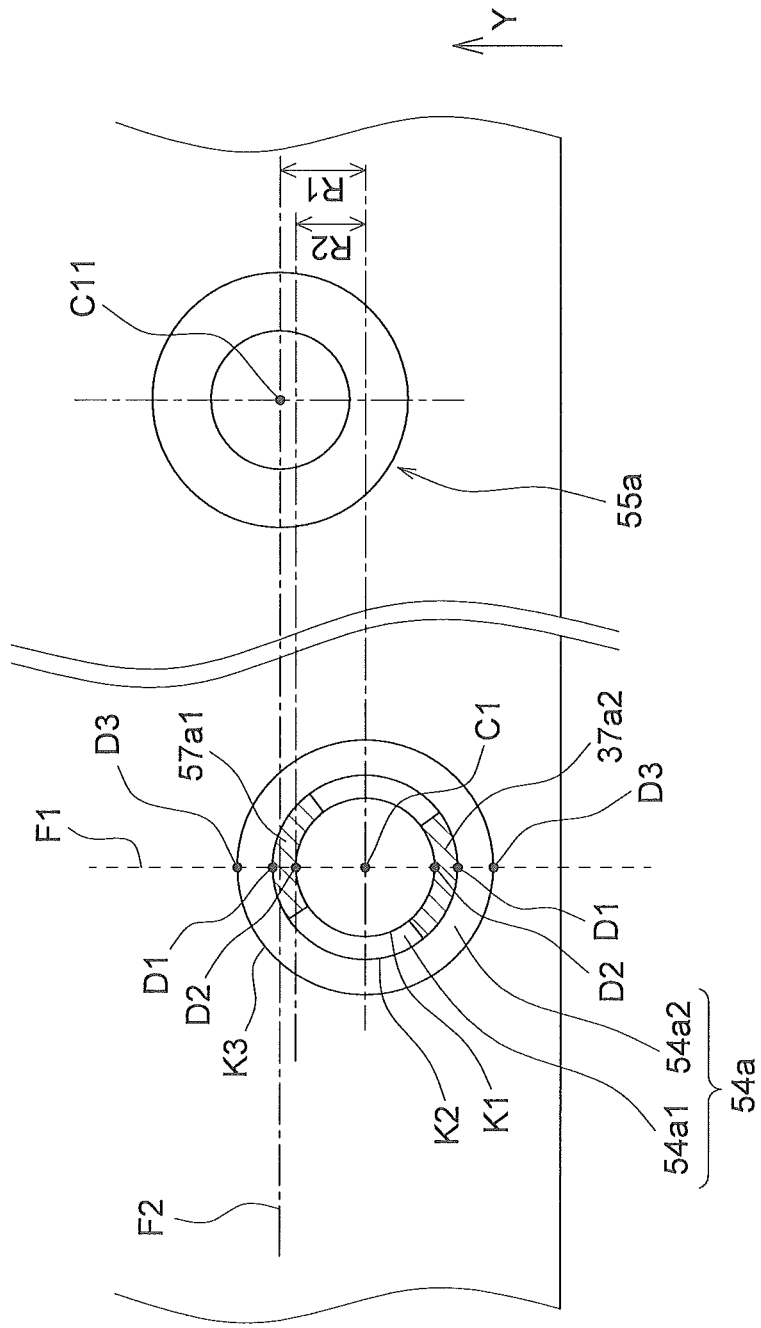
FIG. 14 is diagram of the positional relation between the first cam follower and the first auxiliary pin.

FIG. 14 is diagram of the positional relation between the first cam follower 54a and the first auxiliary pin 55a. As shown in FIG. 14, a first distance R1 in the Y axis direction from the center axis C1 of the first cam follower 54a to the center axis C11 of the first auxiliary pin 55a is longer than a second distance R2 in the Y axis direction from the center axis C1 of the first cam follower 54a to the second reference points D2. In other words, the center axis C11 of the first auxiliary pin 55a is disposed at a position farther away from the center axis C1 of the first cam follower 54a than the second reference points D2. In this embodiment, the center axis C11 of the first auxiliary pin 55a is disposed between the first reference points D1 and the second reference points D2 in the Y axis direction. This means that a second reference plane F2 including the center axis C11 and perpendicular to the Y axis direction is disposed at a position farther away from the center axis C1 of the first cam follower 54a than the second reference points D2 in the Y axis direction, and is disposed between the first reference points D1 and the second reference points D2 in the Y axis direction.

(3) Rectilinear Projections 56a to 56e

Figure 15:
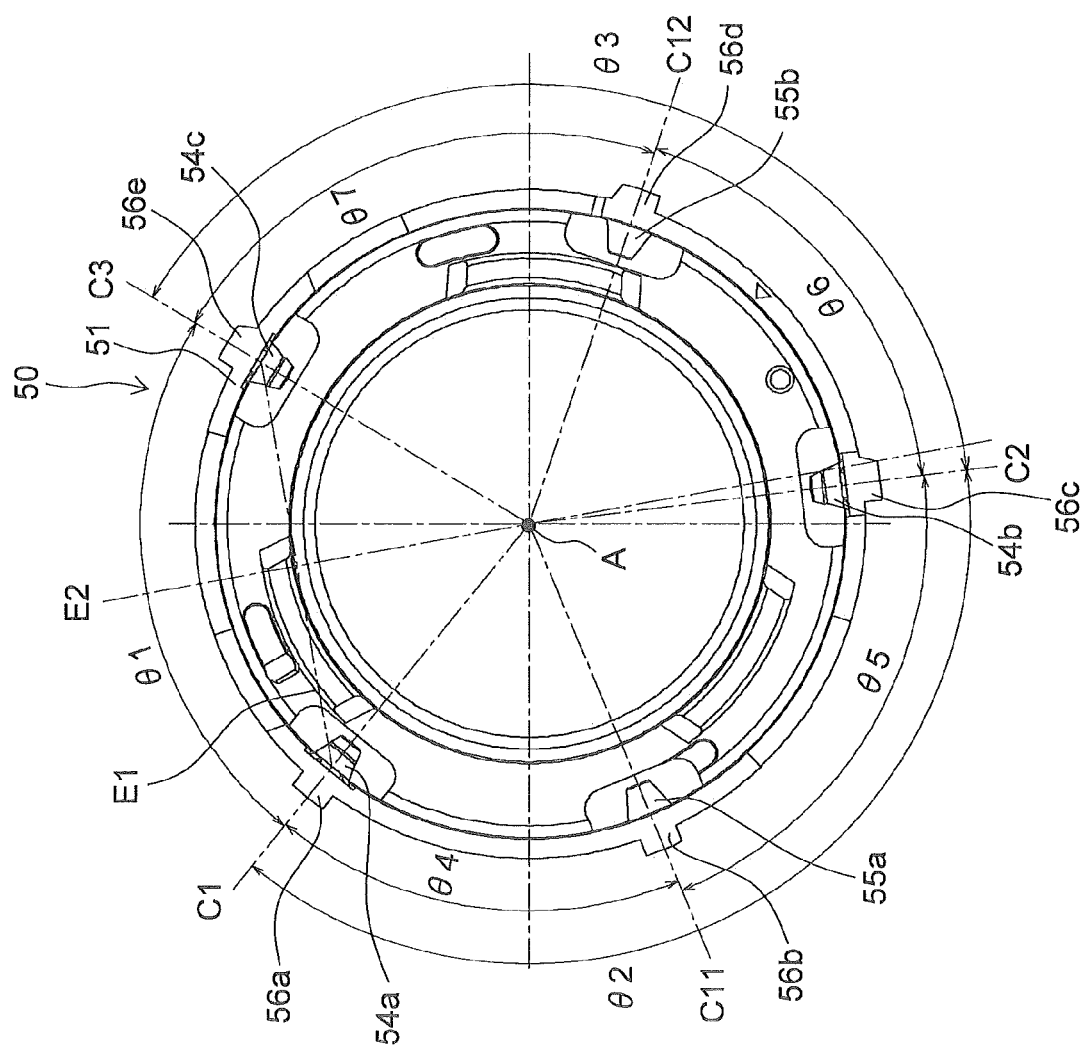
FIG. 15 is a plan view of a first lens frame.

FIG. 15 is a plan view of the first lens frame 50. As shown in FIG. 15, the rectilinear projections 56a to 56e protrude outward in the radial direction from the first lens frame main body 51, and are inserted into rectilinear grooves 41 in the intermediate frame 40 (see FIG. 3). The rectilinear projections 56a to 56e are disposed on the outer peripheral side of the first to third cam followers 54a to 54c and the first and second auxiliary pins 55a and 55b. More specifically, the rectilinear projection 56a is disposed at substantially the same position as the first cam follower 54a in the peripheral direction, and is disposed on the outside in the radial direction with respect to the first cam follower 54a. The rectilinear projection 56c is disposed at substantially the same position as the second cam follower 54b in the peripheral direction, and is disposed on the outside in the radial direction with respect to the second cam follower 54b. The rectilinear projection 56e is disposed at substantially the same position as the third cam follower 54c in the peripheral direction, and is disposed on the outside in the radial direction with respect to the third cam follower 54c. The rectilinear projection 56b is disposed at substantially the same position as the first auxiliary pin 55a in the peripheral direction, and is disposed on the outside in the radial direction with respect to the first auxiliary pin 55a. The rectilinear projection 56d is disposed at substantially the same position as the second auxiliary pin 55b in the peripheral direction, and is disposed on the outside in the radial direction with respect to the second auxiliary pin 55b.

The first to third cam followers 54a to 54c all have the same shape, but are disposed unevenly in the peripheral direction. When viewed in the Y axis direction, a first angle θ1 (an example of a first angle) formed by the first cam follower 54a and the third cam follower 54c is less than a second angle θ2 (an example of a second angle) formed by the first cam follower 54a and the second cam follower 54b, and is less than a third angle θ3 (an example of a third angle) formed by the second cam follower 54b and the third cam follower 54c. More precisely, the relation between the first to third angles θ1 to θ3 is θ1<θ2<θ3.

The first and second auxiliary pins 55a and 55b both have the same shape, but are disposed unevenly in the peripheral direction. When viewed in the Y axis direction, the first auxiliary pin 55a (an example of a first protrusion) is disposed between the first cam follower 54a and the second cam follower 54b, and the second auxiliary pin 55b (an example of a second protrusion) is disposed between the second cam follower 54b and the third cam follower 54c.

Thus, since the first auxiliary pin 55a is disposed between the first cam follower 54a and the second cam follower 54b, and the second auxiliary pin 55b is disposed between the second cam follower 54b and the third cam follower 54c, the first and second auxiliary pins 55a and 55b can be provided to increase strength, and the first to third cam followers 54a to 54c that position the first lens frame 50 can be disposed suitably spaced apart, without being bunched together. Also, since θ1<θ2<θ3 is satisfied, the first to third cam followers 54a to 54c can be disposed more suitably spaced apart.

The first angle θ1 is greater than a fourth angle θ4 (an example of a fourth angle) formed by the first cam follower 54a and the first auxiliary pin 55a, greater than a fifth angle θ5 (an example of a fifth angle) formed by the first auxiliary pin 55a and the second cam follower 54b, greater than a sixth angle θ6 (an example of a sixth angle) formed by the second cam follower 54b and the second auxiliary pin 55b, and greater than a seventh angle θ7 (an example of a seventh angle) formed by the second auxiliary pin 55b and the third cam follower 54c.

Furthermore, the first auxiliary pin 55a is disposed closer to the first cam follower 54a than the second cam follower 54b in the peripheral direction. The second auxiliary pin 55b is disposed closer to the second cam follower 54b than the third cam follower 54c in the peripheral direction. That is, the fourth angle θ4 is less than the fifth angle θ5, and the sixth angle θ6 is less than the seventh angle θ7. In this embodiment, θ4<θ6<θ5<θ7<θ1 is satisfied. This means that the first to third cam followers 54a to 54c and the first and second auxiliary pins 55a and 55b are disposed unevenly in the peripheral direction.

Here, the first to seventh angles θ1 to θ7 are determined using the center axes C1 to C3 of the first to third cam followers 54a to 54c and the center axes C11 and C12 of the first and second auxiliary pins 55a and 55b as references.

The layout of the cam grooves and cam followers will also be described from another standpoint.

The positional relation between the first to third cam followers 54a to 54c and the first and second auxiliary pins 55a and 55b satisfies the following conditions. In the following conditions, portions or members such as the first to third cam followers 54a to 54c and the first and second auxiliary pins 55a and 55b will be called "projections."

(1) The number of projections can be expressed by N (N=3M+B, where N is a natural number, M is a natural number, and B is 1 or 2).

(2) The angle in the peripheral direction of all combinations of adjacent projections is less than 360/(N−1).

(3) Of all pairs of projections that are arranged such that one is M number of projections away from the other in the peripheral direction, the two projections with the largest angle shall be termed first projections. Meanwhile, of the projections, those closest to a perpendicular bisector of a line segment linking the two first projections shall be termed second projections. The first projections and second projections are inserted into their respective cam grooves.

If these conditions are applied to the above-mentioned configuration, as shown in FIG. 15, the first lens frame 50 has the first to third cam followers 54a to 54c and the first and second auxiliary pins 55a and 55b disposed spaced apart in the peripheral direction. That is, the first lens frame 50 can be defined as having five projections. In other words, based on condition (1), N=5, M=1, and B=2 are satisfied in this embodiment.

Also, N=5 is satisfied and from condition (2), θs=360/(N−1)=90 degrees is obtained. The angles in the peripheral direction of all combinations of adjacent first to third cam followers 54a to 54c and first and second auxiliary pins 55a and 55b (that is, the first angle θ1, the fourth angle θ4, the fifth angle θ5, the sixth angle θ6, and the seventh angle θ7) are all less than 90 degrees. Therefore, it can be seen that the lens barrel 3 pertaining to this embodiment satisfies condition (2).

In this embodiment, N=5 is satisfied and θs=90 degrees is obtained. Therefore, the first angle θ1, the fourth angle θ4, the fifth angle θ5, the sixth angle θ6, and the seventh angle θ7 are all less than 90 degrees.

Furthermore, M=1 is satisfied and from condition (3), of all pairs of adjacent projections (the first to third cam followers 54a to 54c and the first and second auxiliary pins 55a and 55b), the two projections with the largest angle in the peripheral direction are the first cam follower 54a and the third cam follower 54c. Also, of the five projections, the second cam follower 54b is the one closest to a perpendicular bisector E2 of a line segment E1 that links the first cam follower 54a and the third cam follower 54c. The first cam follower 54a (first projection), the second cam follower 54b (second projection), and the third cam follower 54c (first projection) are respectively inserted into the first outer cam groove 34a, the second outer cam groove 34b, and the third outer cam groove 34c.

With a layout such as this, the first to third cam followers 54a to 54c that are used for positioning the first lens frame 50 can be disposed suitably spaced apart, without being bunched together.

Second Embodiment

In the above embodiment, five projections were provided to the inner peripheral face of the first lens frame 50 as cam followers, auxiliary pins, or other such projections. The five projections consisted of three cam followers (the first to third cam followers 54a to 54c) and two auxiliary pins (the first and second auxiliary pins 55a and 55b).

All five of the projections may have the same shape. In the following description, those components having substantially the same function as in the first embodiment above will be numbered the same and will not be described in detail again.

Figure 16:
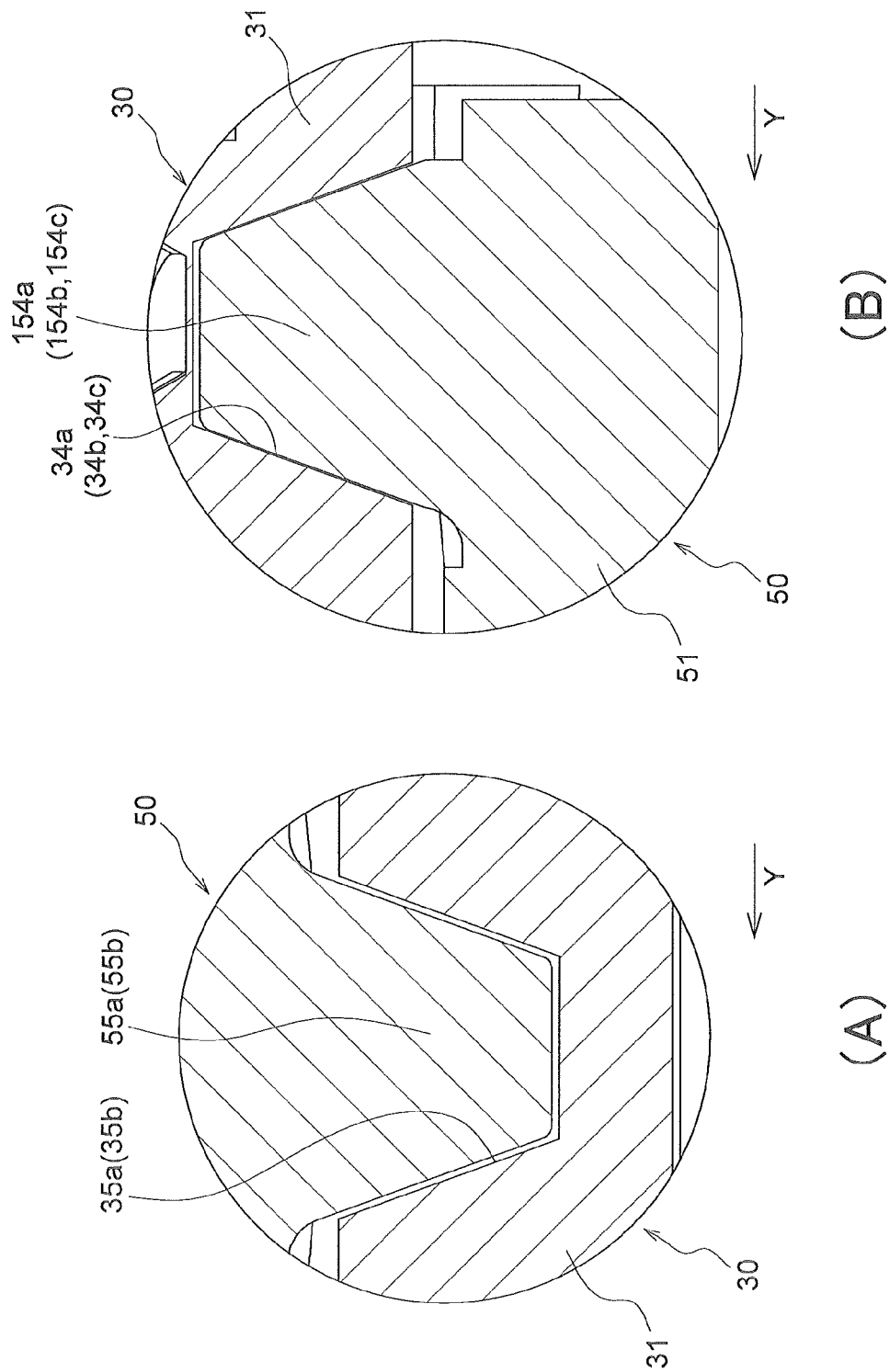
FIG. 16A is an enlarged cross section of the area around an auxiliary pin.
FIG. 16B is an enlarged cross section of the area around a cam follower (second embodiment)

As shown in FIGS. 16A and 16B, the five projections may all have the same shape as the above-mentioned first and second auxiliary pins 55a and 55b. In this case, the first lens frame 50 has first to third cam followers 154a to 154c and the first and second auxiliary pins 55a and 55b. The first to third cam followers 154a to 154c have the same shape as the first and second auxiliary pins 55a and 55b. The first to third cam followers 154a to 154c are respectively inserted into the first to third outer cam grooves 34a to 34c and contact the first to third outer cam grooves 34a to 34c, just as with the first to third cam followers 54a to 54c.

Figure 17:
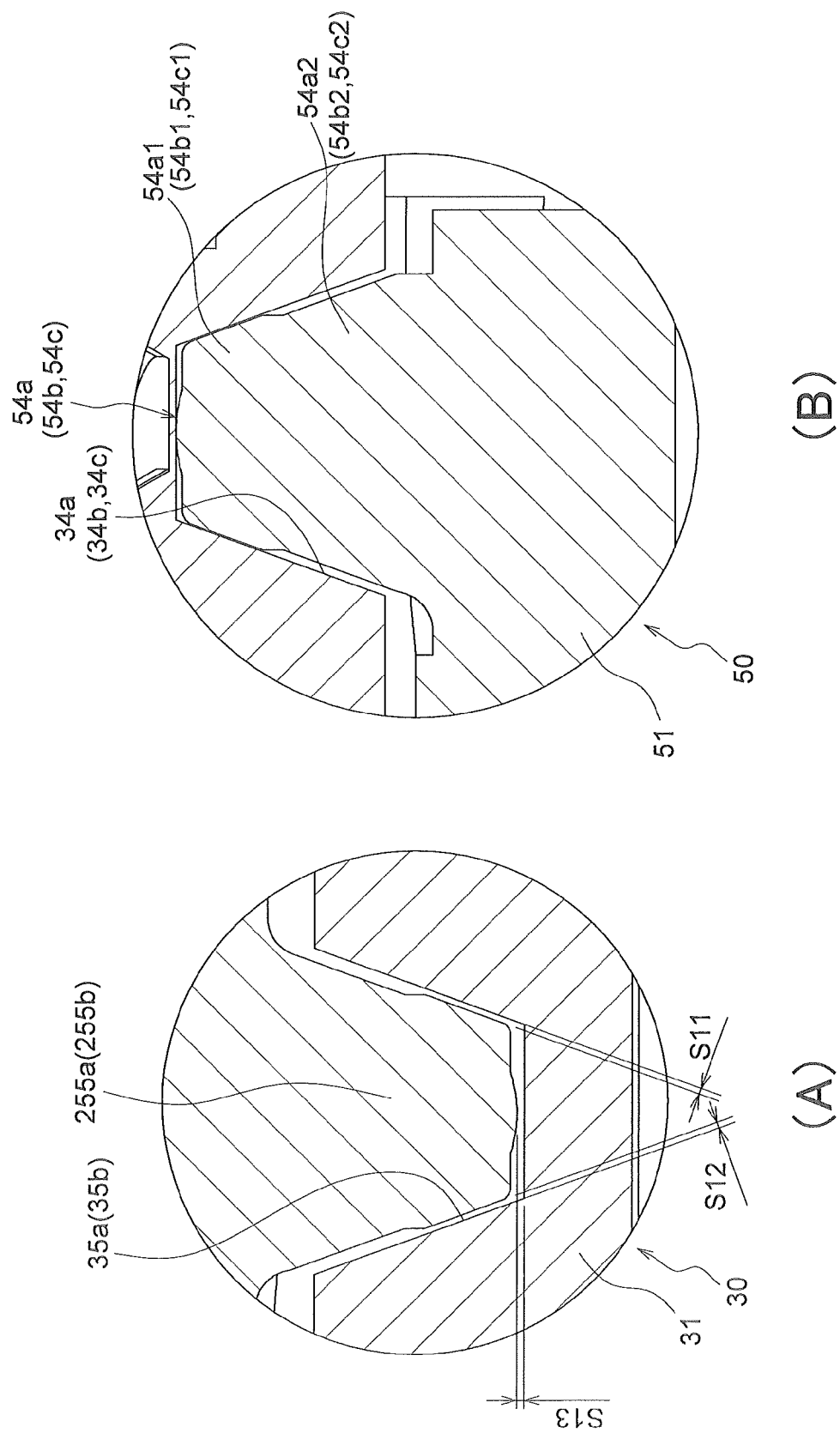
FIG. 17A is an enlarged cross section of the area around an auxiliary pin.
FIG. 17B is an enlarged cross section of the area around a cam follower (second embodiment)

Also, as shown in FIGS. 17A and 17B, the five projections may all have the same shape as the above-mentioned first to third cam followers 54a to 54c. In this case, the first lens frame 50 has the first to third cam followers 54a to 54c and first and second auxiliary pins 255a and 255b. The first and second auxiliary pins 255a and 255b have the same shape as the first to third cam followers 54a to 54c. The first and second auxiliary pins 255a and 255b are respectively inserted into the first and second auxiliary grooves 35a and 35b and contact the first and second auxiliary grooves 35a and 35b, just as with the first and second auxiliary pins 55a and 55b.

The above configuration yields the same effect as the first embodiment.

Other Embodiments

The present invention is not limited to the embodiments given above, and various modifications and alterations are possible without departing from the scope of the present invention.

Those components having substantially the same function as in the above embodiments will be numbered the same and will not be described in detail again.

(A) The configuration of the lens barrel is not limited to that of the above-mentioned lens barrel 3.

(B) In the above embodiments, a first frame was described using the drive frame 30 as an example, but the configuration of the first frame is not limited to that of the drive frame 30. For example, the first frame may have a substantially cylindrical shape. Also, the cam grooves were described using the first to third outer cam grooves 34a to 34c as an example, but the configuration of the cam grooves is not limited to that of the first to third outer cam grooves 34a to 34c. For example, the number of cam grooves is at least three. Also, the first to third outer cam grooves 34a to 34c were grooves having a bottom face, but the cam grooves may instead be through-grooves. Furthermore, the first side wall component was described using the first rear side wall component 35az1 and the second rear side wall component 35bz1 as an example, but the number of first side wall components may be at least one. Also, the first side wall component may have any shape so long as it is able to come into contact with a protrusion of the second frame. For instance, in the above embodiments, the first rear side wall component 35az1 formed part of the first auxiliary groove 35a, but the first side wall component need not form part of an auxiliary groove.

(C) In the above embodiments, the second frame was described using the first lens frame 50 as an example, but the configuration of the second frame is not limited to that of the first lens frame 50. For example, the second frame need not have a cylindrical shape. Also, the cam followers were described using the first to third cam followers 54a to 54c as an example, but the configuration of the cam followers (such as their shape and layout) is not limited to that of the first to third cam followers 54a to 54c. Also, the number of cam follower is at least three, for example. The protrusions were described using the first and second auxiliary pins 55a and 55b as an example, but the configuration of the protrusions (such as their shape and layout) is not limited to that of the first and second auxiliary pins 55a and 55b.

(D) In the above embodiments, the positions of the protrusions (the first and second auxiliary pins 55a and 55b) were offset to the Y axis direction positive side (subject side) with respect to the positions of the cam followers (the first to third cam followers 54a to 54c), but the positions of the protrusions and the positional relation to the positions of the cam followers in the Y axis direction (first direction) are not limited to those in the above embodiments. In the above embodiments, the positions of the first and second auxiliary pins 55a and 55b were offset to the Y axis direction positive side with respect to the first to third cam followers 54a to 54c, but the positional relation between the cam followers and protrusions is not limited to that in the above embodiments.

For example, the amount of offset of the first and second auxiliary pins 55a and 55b is not limited to that in the above embodiments. More specifically, the first distance R1 may be the same as the second distance R2, and the first distance R1 may be the same as the third distance R3. Also, the first distance R1 may be the same as the fourth distance R4. In other words, the center axis C11 of the first auxiliary pin 55a may be disposed at the same position as the second reference points D2 in the Y axis direction, or may be disposed at the same position as the first reference points D1 in the Y axis direction. Also, the center axis C11 of the first auxiliary pin 55a may be the same as the third reference points D3 in the Y axis direction.

Figure 18:
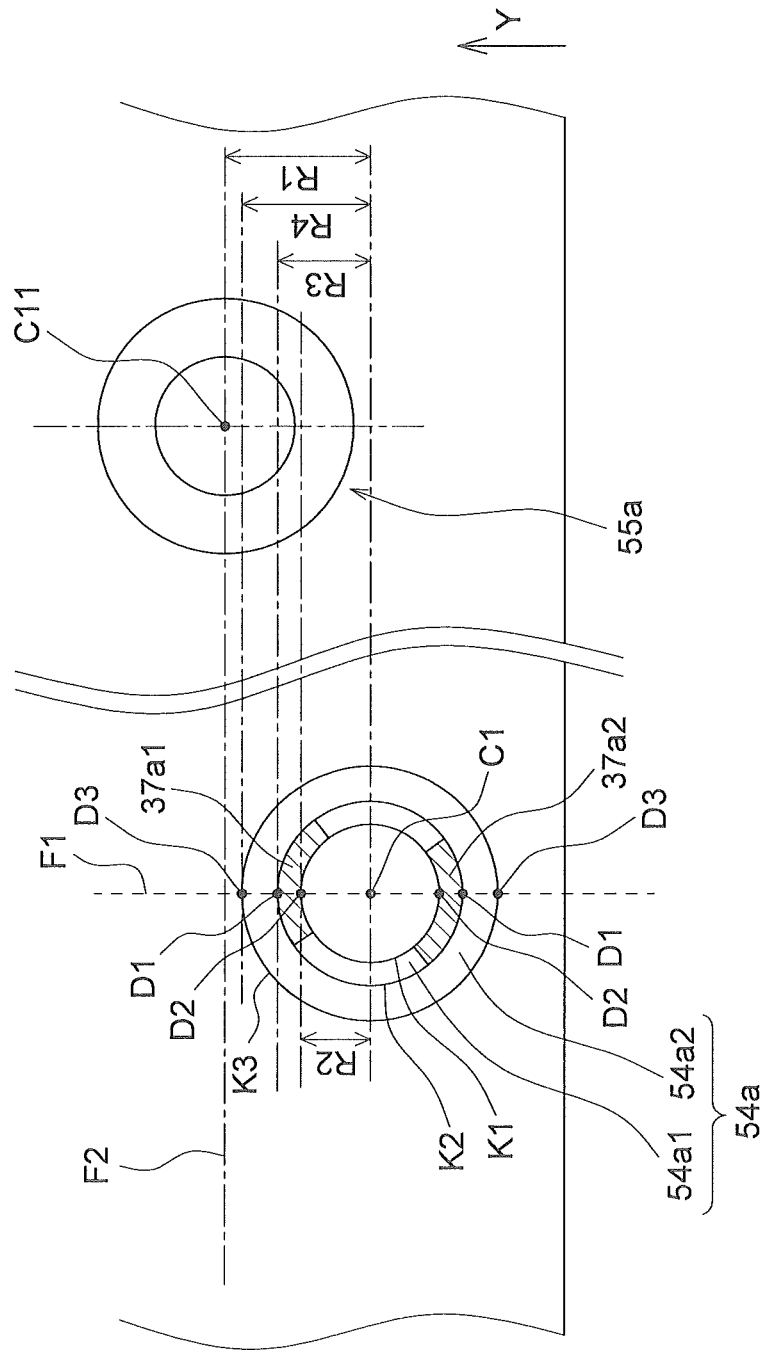
FIG. 18 is diagram of the positional relation between the first cam follower and the first auxiliary pin (other embodiment)

Furthermore, as shown in FIG. 18, the first distance R1 may be longer than the third distance R3. In other words, the center axis C11 of the first auxiliary pin 55a may be disposed at a position farther away from the center axis C1 of the first cam follower 54a than the first reference points D1 in the Y axis direction. With the layout shown in FIG. 18, it can also be said that the first distance R1 is longer than the fourth distance R4. In other words, the center axis C11 of the first auxiliary pin 55a can be said to be disposed at a position that is farther away from the center axis C1 of the first cam follower 54a than the third reference points D3 in the Y axis direction.

Figure 19:
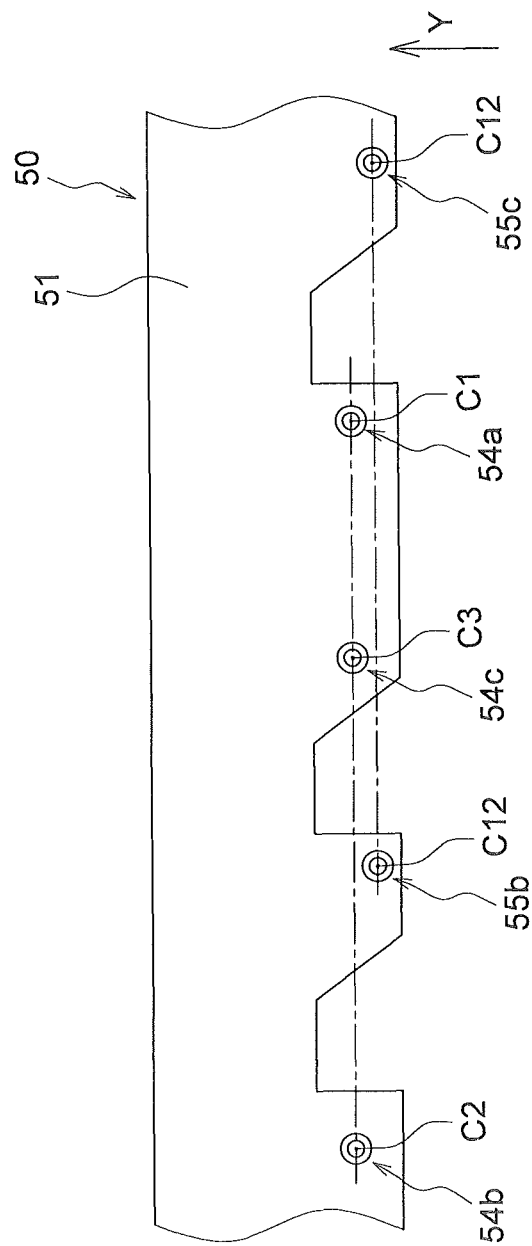
FIG. 19 is a development view of the inner peripheral face of a first lens frame (other embodiment)
Figure 20:
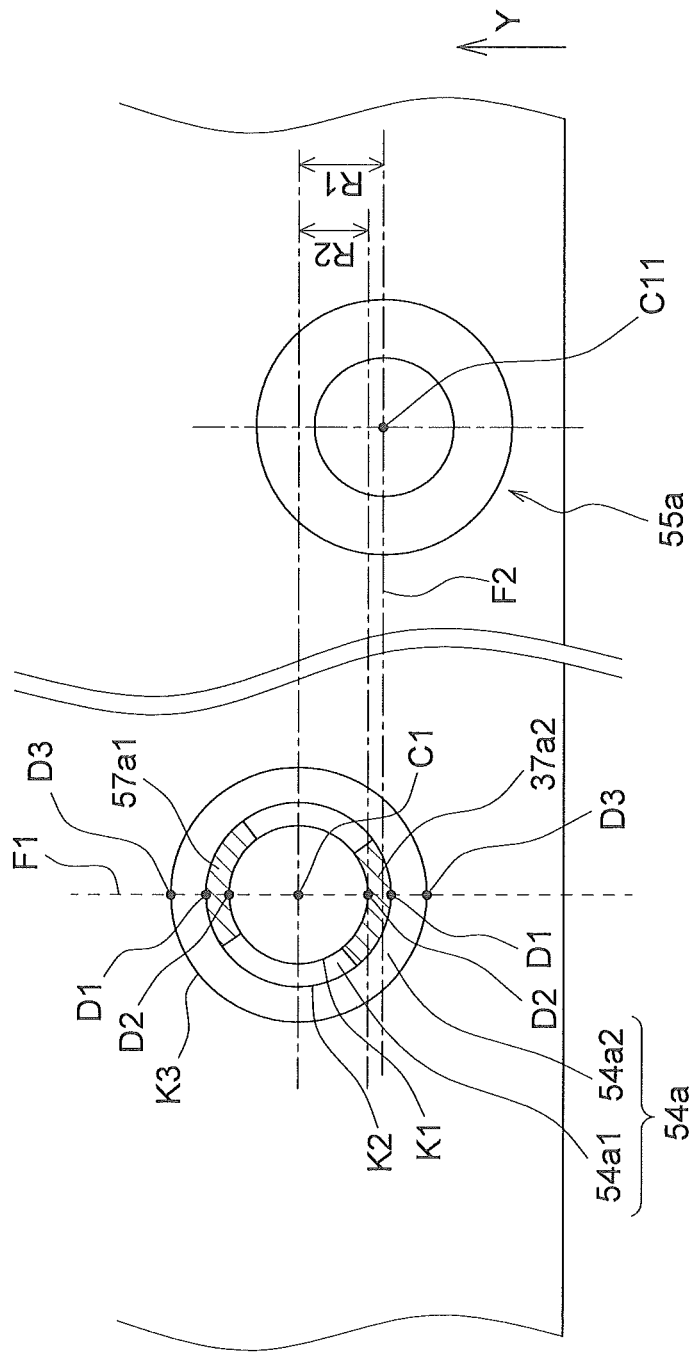
FIG. 20 is diagram of the positional relation between the first cam follower and the first auxiliary pin (other embodiment)

Also, as shown in FIG. 19, for example, the positions of the first and second auxiliary pins 55a and 55b may be offset to the Y axis direction negative side (the opposite side from the subject side) with respect to the first to third cam followers 54a to 54c. Furthermore, just as in the cases shown in FIGS. 14 and 18, various scenarios are possible for the amount of offset of the first and second auxiliary pins 55a and 55b. For instance, as shown in FIG. 20, just as in the above embodiments, the position of the center axis C11 of the first auxiliary pin 55a may be farther away from the center axis C1 of the first cam follower 54a than the first reference points D1 in the Y axis direction. Furthermore, the layout of the center axis C11 of the first auxiliary pin 55a may be one in which the layout shown in FIG. 18 is reversed up and down. With the layout shown in FIG. 20, if we term the intersection between the first reference plane F1 and the first boundary K1 as first imaginary points, then of the two first imaginary points, the one disposed at a position closest to the center axis C11 of the first auxiliary pin 55a is the first imaginary point disposed on the Y axis direction negative side of the center axis C11. Therefore, the first reference points D1 are disposed on the Y axis direction negative side of the center axis C11. The same applies to the second reference points D2 and the third reference points D3.

Figure 21:
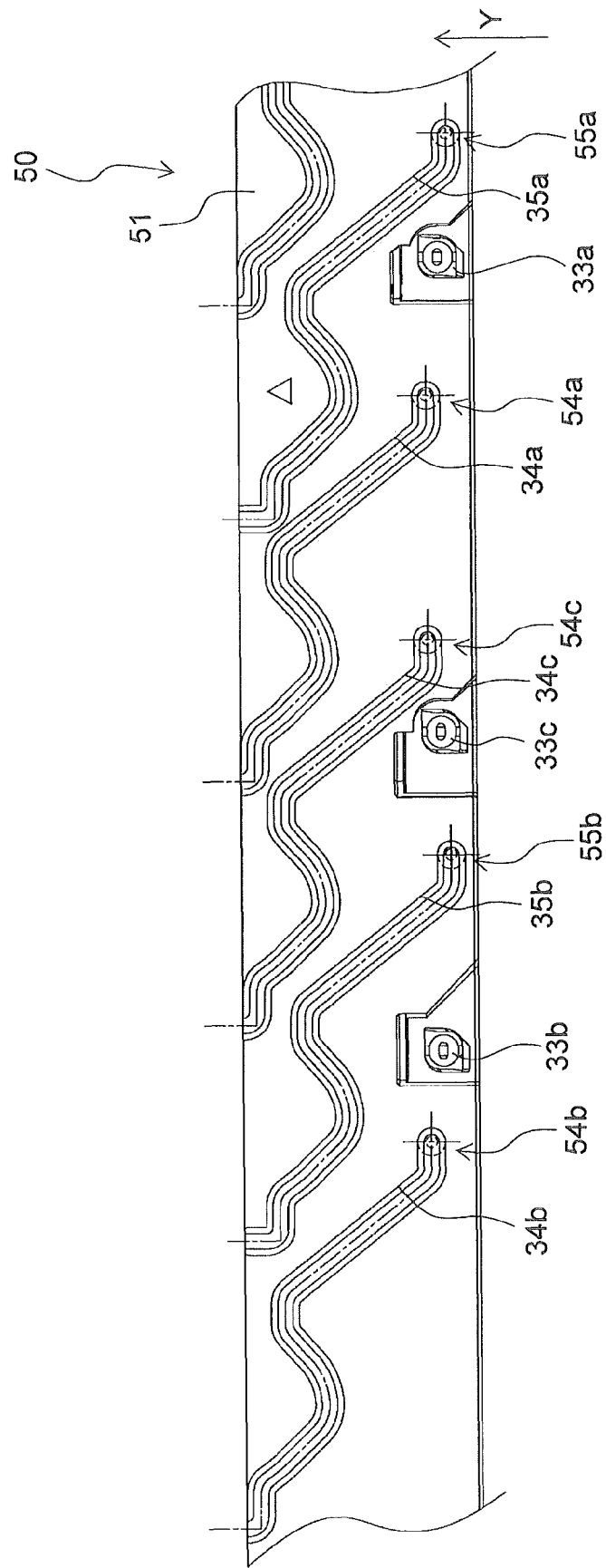
FIG. 21 is a development view of the outer peripheral face of a drive frame (other embodiment)

The layout changes shown in FIG. 19 are accompanied by the changes to the layout of the grooves shown in FIG. 21, for example.

(E) In the above embodiments, the first auxiliary groove 35a and the second auxiliary groove 35b were described as examples of auxiliary grooves, but the auxiliary grooves may instead be through-grooves.

Figure 22:
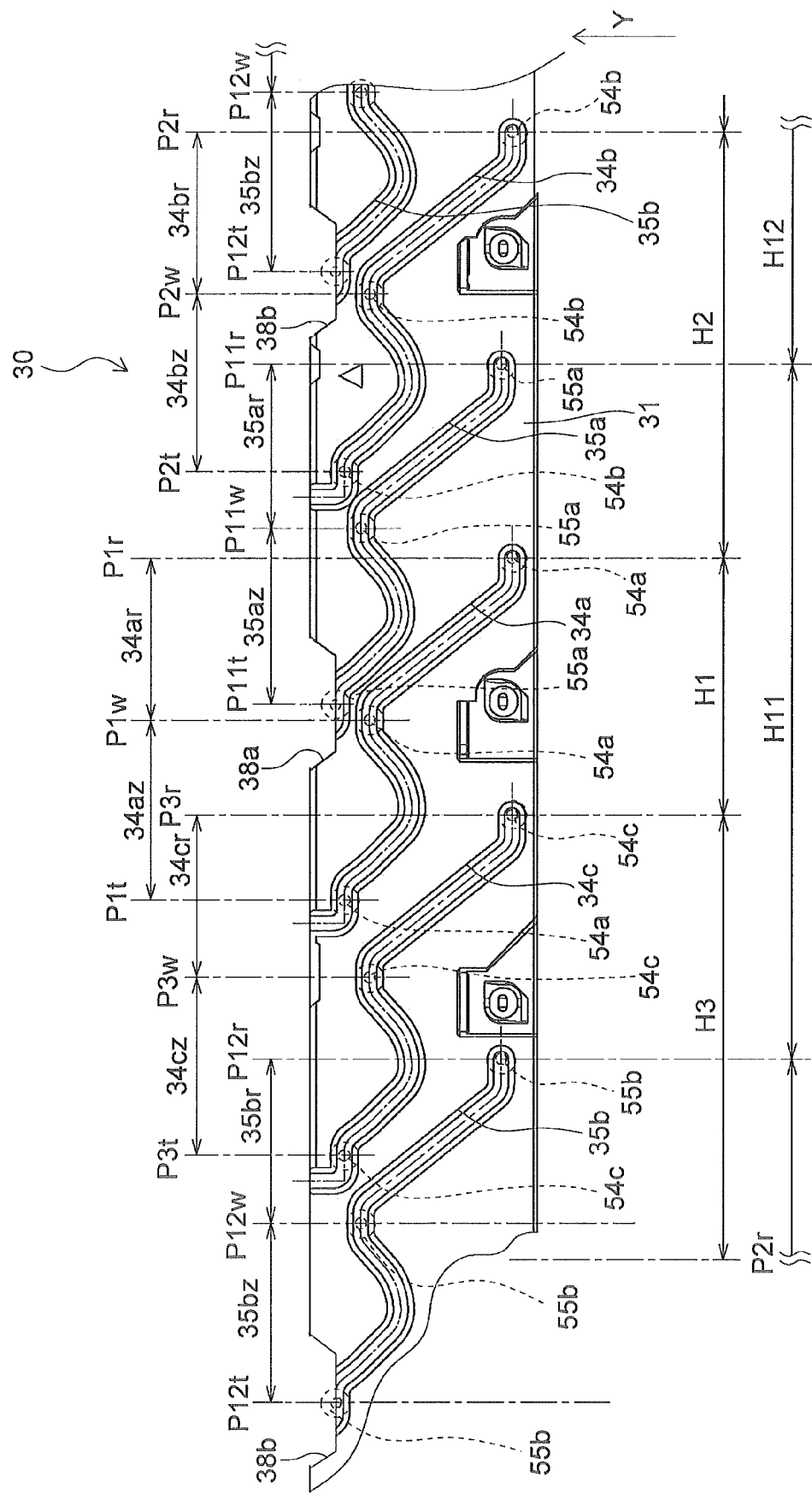
FIG. 22 is a development view of the outer peripheral face of a drive frame (other embodiment)

Also, as shown in FIG. 22, a part of the auxiliary grooves need not be a groove. More specifically, the end of the first auxiliary groove 35a may be eliminated by a cut-out 38a. Also, the end of the second auxiliary groove 35b may be eliminated by a cut-out 38b.

Figure 23:
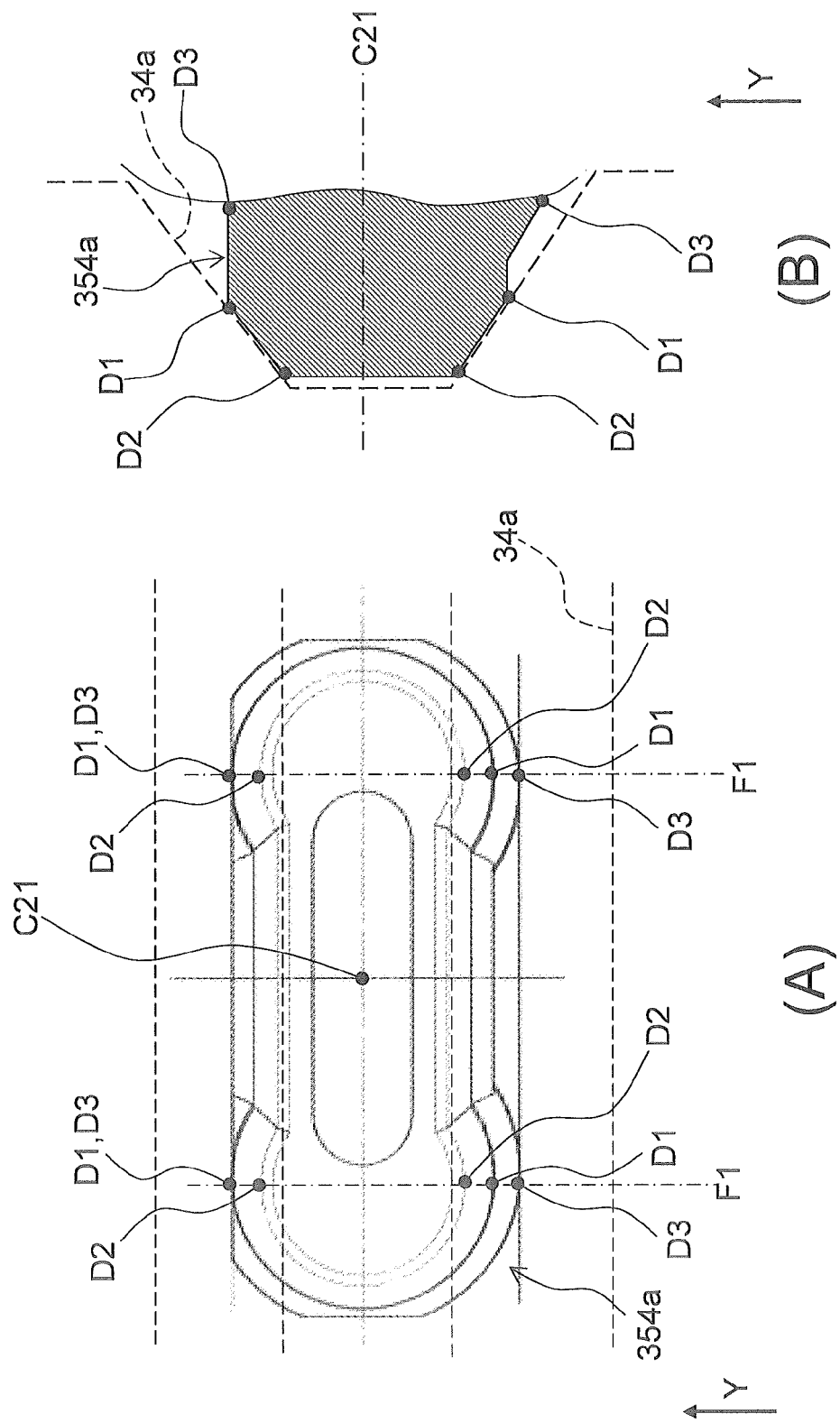
FIG. 23A is a plan view of a cam follower.
FIG. 23B is a cross section of a cam follower (other embodiment).

(F) The cam followers may also have the shape shown in FIG. 23. The cam follower 354a shown in FIG. 23 is formed in a more slender shape in one direction than the first to third cam followers 54a to 54c. The cam follower 354a has a first sliding face 357a, a second sliding face 357b, a third sliding face 357c, and a fourth sliding face 357d. The first to fourth sliding faces 357a to 357d respectively include the first reference points D1 and the second reference points D2. Also, the outer face of the cam follower 354a includes the third reference points D3.

In the case of the cam follower 354a, four of each of the first to fourth reference points D1 to D4 can be defined. The first reference points D1 are disposed at positions farthest away from the center axis C21 of the cam follower 354a in the Y axis direction. The second reference points D2 are disposed at positions closest to the center axis C21 of the cam follower 354a, out of the points included in the first reference plane F1 and the first sliding face 357a. The second reference points D2 are disposed at positions closest to the center axis C21 of the cam follower 354a, out of the points included in the first reference plane F1 and the second sliding face 357b. The second reference points D2 are disposed at positions closest to the center axis C21 of the cam follower 354a, out of the points included in the first reference plane F1 and the third sliding face 357c. The second reference points D2 are disposed at positions closest to the center axis C21 of the cam follower 354a, out of the points included in the first reference plane F1 and the fourth sliding face 357d. The third reference points D3 are disposed at positions farthest away from the center axis C21 of the cam follower 354a, out of the points included in the outer face of the cam follower 354a and the first reference plane F1. The center axis C21 of the cam follower 354a passes through the drawing center found geometrically on the basis of the plan view shown in FIG. 23A, for example. The center axis C21 is a line that passes through the drawing center and coincides with the radial direction of the first lens frame 50.

Thus, there are various possibilities for the shape of the cam followers and protrusions, but the center axes, the first reference points D1, the second reference points D2, and the third reference points D3 can be unequivocally defined using a plan view or the like. If there are a plurality of first reference points D1, the positional relation of the cam followers and the protrusion in the Y axis direction may be specified using one of these first reference points D1. The same applies to the second reference points D2 and the third reference points D3.

The center axes C1 to C3 of the first to third cam followers 54a to 54c and the center axes C11 and C12 of the first and second auxiliary pins 55a and 55b can also be found as a line passing through the drawing center found geometrically on the basis of a plan view.

(G) The number of projections is not limited to five. For example, the number of protrusions may be one, or may be three or more.

Features of Embodiments

Features of the embodiments will be listed below. The inventions included in the embodiments are not limited to what follows. Furthermore, what is given in parentheses after the various components is specific examples of components give to aid an understanding of the features. The various components are not limited to or by these specific examples. Also, components other than those mentioned in the listed features may be modified or omitted to obtain the effects mentioned for the various features.

[1] The lens barrel (3) pertaining to a first feature comprises:

a first frame (30) that is a substantially cylindrical frame and has at least three cam grooves (34a, 34b, 34c) disposed spaced apart in the peripheral direction, and at least one first side wall component (35az1, 35bz1) disposed between adjacent cam grooves (34a, 34b, 34c); and a second frame (50) that has at least three cam followers (34a, 34b, 34c) respectively inserted into the cam grooves (34a, 34b, 34c), and at least one protrusion (55a, 55b) disposed so as to be able to come into contact with the first side wall component (35az1, 35bz1), wherein when the first frame (30) and the second frame (50) rotate relatively, the first frame (30) and the second frame (50) are able to move relatively in a first direction (Y axis direction), when viewed in the first direction (Y axis direction) of the first frame (30), the protrusion (55a, 55b) is disposed between the cam followers (54a, 54b, 54c) in the peripheral direction, and the position of the protrusion (55a, 55b) is offset from the positions of the cam followers (54a, 54b, 54c) in the first direction (Y axis direction).

With this lens barrel (3), even if an external force is exerted, the protrusion (55a, 55b) will come into contact with the first side wall component (35az1, 35bz1), so the external force can be borne by the protrusion (55a, 55b) and the first side wall component (35az1, 35bz1) in addition to the cam followers (54a, 54b, 54c) and cam grooves (34a, 34b, 34c). Therefore, damage to the first frame (30) and second frame (50) can be suppressed.

Also, when viewed in the first direction (Y axis direction), the protrusion (55a, 55b) is disposed between the cam followers (54a, 54b, 54c) in the peripheral direction. Furthermore, the position of the protrusion (55a, 55b) is offset from the positions of the cam followers (54a, 54b, 54c) in the first direction (Y axis direction), so the position of the first side wall component (35az1, 35bz1) is offset in the first direction (Y axis direction) from the positions of the cam grooves (34a, 34b, 34c). If the position of the first side wall component (35az1, 35bz1) is offset in the first direction (Y axis direction) from the positions of the cam grooves (34a, 34b, 34c), the first side wall component (35az1, 35bz1) and the cam grooves (34a, 34b, 34c) can be disposed more efficiently.

The phrase "the first frame and the second frame rotate relatively" used in this Specification encompasses the meaning of both that the second frame rotates with respect to the first frame and that the first frame rotates with respect to the second frame, in a state in which the first frame and/or the second frame is rotating. Also, the phrase "the first frame and the second frame move relatively" encompasses the meaning of both that the second frame moves with respect to the first frame and that the first frame moves with respect to the second frame, in a state in which the first frame and/or the second frame is moving.

[2] The lens barrel (3) pertaining to a second feature is the lens barrel (3) pertaining to the first feature, wherein the center axis (C11) of the protrusion (55a, 55b) is offset from the center axis (C1) of the cam followers (54a, 54b, 54c) in the first direction (Y axis direction).

[3] The lens barrel (3) pertaining to a third feature is the lens barrel (3) pertaining to the first or second feature, wherein the cam followers (54a, 54b, 54c) have sliding faces (57a1, 57a2) capable of sliding over the cam grooves (34a, 34b, 34c), the sliding faces (57a1, 57a2) each include a first reference point (D1) disposed at a position that is farthest away from the center axis (C1) of the cam followers (54a, 54b, 54c) in the first direction (Y axis direction), and a second reference point (D2) disposed at a position that is closest to the center axis (C1) of the cam followers (54a, 54b, 54c), out of the points included in a reference plane (F1) and the sliding face (57a1, 57a2), when the reference plane (F1) is a plane that is parallel to the first direction (Y axis direction) and the center axis (C1) of the cam followers (54a, 54b, 54c) and that passes through the first reference point (D1), and a first distance (R1) in the first direction (Y axis direction) from the center axis (C1) of the cam followers (54a, 54b, 54c) to the center axis (C11) of the protrusion (55a, 55b) is either the same as a second distance (R2) in the first direction (Y axis direction) from the center axis (C1) of the cam followers (54a, 54b, 54c) to the second reference point (D2), or longer than the second distance (R2).

[4] The lens barrel (3) pertaining to a fourth feature is the lens barrel (3) pertaining to any of the first to third features, wherein the first distance (R1) in the first direction (Y axis direction) from the center axis (C1) of the cam followers (54a, 54b, 54c) to the center axis (C11) of the protrusion (55a, 55b) is either the same as a third distance (R3) in the first direction (Y axis direction) from the center axis (C1) of the cam followers (54a, 54b, 54c) to the first reference point (D1), or longer than the third distance (R3).

[5] The lens barrel (3) pertaining to a fifth feature is the lens barrel (3) pertaining to any of the first to fourth features, wherein the sliding faces (57a1, 57a2) each include a third reference point disposed at a position that is farthest away from the center axis (C1) of the cam followers (54a, 54b, 54c), out of the points included in the reference plane (F1) and the outer face of the cam followers (54a, 54b, 54c), and the first distance (R1) in the first direction (Y axis direction) from the center axis (C1) of the cam followers (54a, 54b, 54c) to the center axis (C11) of the protrusion (55a, 55b) is either the same as a fourth distance (R4) in the first direction (Y axis direction) from the center axis (C1) of the cam followers (54a, 54b, 54c) to the third reference point, or longer than the fourth distance (R4).

[6] The lens barrel (3) pertaining to the sixth feature is the lens barrel (3) pertaining to any of the first to fifth features, wherein the at least three cam followers (54a, 54b, 54c) include a first cam follower (54a), a second cam follower (54b), and a third cam follower (54c), the at least one protrusion (55a, 55b) includes a first protrusion (55a) and a second protrusion (55b), and when viewed in the first direction (Y axis direction), the first protrusion (55a) is disposed between the first cam follower (54a) and the second cam follower (54b), and the second protrusion (55b) is disposed between the second cam follower (54b) and the third cam follower (54c).

With this lens barrel (3), since the first auxiliary pin (55a) is disposed between the first cam follower (54a) and the second cam follower (54b), and the second protrusion (55b) is disposed between the second cam follower (54b) and the third cam follower (54c), the first and second protrusions (55a, 55b) can be provided to increase strength, and the first to third cam followers (54a to 54c) that position the second frame (50) can be disposed suitably spaced apart, without being bunched together. Consequently, when the first to third cam followers (54a to 54c) and the first and second protrusions (55a, 55b) are subjected to an external force, that external force can be dispersed relatively uniformly.

[7] The lens barrel (3) pertaining to a seventh feature is the lens barrel (3) pertaining to the sixth feature, wherein a first angle (θ1) formed by the first cam follower (54a) and the third cam follower (54c) is less than a second angle (θ2) formed by the first cam follower (54a) and the second cam follower (54b), and is less than a third angle (θ3) formed by the second cam follower (54b) and the third cam follower (54c).

With this lens barrel (3), since the first angle (θ1) is less than the second angle (θ2), and is less than the third angle (θ3), the first and second protrusions (55a, 55b) can be provided within the relatively wide second angle (θ2) and third angle (θ3). Therefore, the first to third cam followers (54a to 54c) can be disposed more suitably spaced apart, and external force can be dispersed more evenly.

[8] The lens barrel (3) pertaining to an eighth feature is the lens barrel (3) pertaining to the seventh feature, wherein the (θ1) formed by the first cam follower (54a) and the third cam follower (54c) is greater than a fourth angle (θ4) formed by the first cam follower (54a) and the first protrusion (55a), a fifth angle (θ5) formed by the first protrusion (55a) and the second cam follower (54b), a sixth angle (θ6) formed by the second cam follower (54b) and the second protrusion (55b), and a seventh angle (θ7) formed by the second protrusion (55b) and the third cam follower (54c).

[9] The lens barrel (3) pertaining to a ninth feature is the lens barrel (3) pertaining to any of the first to eighth features, further comprising an optical system (V) including at least one lens, wherein the cam grooves (34a, 34b, 34c) have zoom components (34az, 34bz, 34cz) that guide the cam followers (54a, 54b, 54c) from a telephoto position (P1t, P2t, P3t) corresponding to the telephoto end of the optical system (V) to a wide angle position (P1w, P2w, P3w) corresponding to the wide angle end of the optical system (V), and the first side wall component (35az1, 35bz1) is formed along the movement path traced by the protrusion (55a, 55b) when the cam followers (54a, 54b, 54c) are guided by the zoom components (34*az*, 34*bz*, 34*cz*) from the telephoto position (P1*t*, P2*t*, P3*t*) to the wide angle position (P1*w*, P2*w*, P3*w*).

With this lens barrel (3), since the first side wall component (35*az*1, 35*bz*1) is formed along the movement path traced by the protrusion (55*a*, 55*b*) when the cam followers (54*a*, 54*b*, 54*c*) are guided by the zoom components (34*az*, 34*bz*, 34*cz*) from the telephoto position (P1*t*, P2*t*, P3*t*) to the wide angle position (P1*w*, P2*w*, P3*w*), even if an external force is exerted on the lens barrel (3) during imaging, the protrusion will contact the first side wall component (35*az*1, 35*bz*1) and bear part of the external force. Therefore, the strength of the lens barrel (3) can be increased with this configuration.

[10] The lens barrel (3) pertaining to a tenth feature is the lens barrel (3) pertaining to the ninth feature, wherein the first frame (30) has at least one auxiliary groove (35*a*, 35*b*) disposed between adjacent cam grooves (34*a*, 34*b*, 34*c*), the auxiliary groove (35*a*, 35*b*) has the first side wall component (35*az*1, 35*bz*1) and a second side wall component (35*az*2, 35*bz*2) disposed opposite the first side wall component (35*az*1, 35*bz*1), and the protrusion (55*a*, 55*b*) is inserted between the first side wall component (35*az*1, 35*bz*1) and the second side wall component (35*az*2, 35*bz*2) when the cam followers (54*a*, 54*b*, 54*c*) are guided by the zoom component (34*az*, 34*bz*, 34*cz*) from the telephoto position (P1*t*, P2*t*, P3*t*) to the wide angle position (P1*w*, P2*w*, P3*w*).

Therefore, even if an external force is exerted on the lens barrel (3) during imaging, the protrusion will contact the first side wall component (35*az*1, 35*bz*1) or the second side wall component (35*az*2, 35*bz*2) and bear part of the external force, allowing the strength of the lens barrel (3) to be increased.

[11] The lens barrel (3) pertaining to an eleventh feature is the lens barrel (3) pertaining to the tenth feature, wherein there are fewer of the auxiliary grooves (35*a*, 35*b*) than the cam grooves (34*a*, 34*b*, 34*c*).

[12] The lens barrel (3) pertaining to a twelfth feature is the lens barrel (3) pertaining to any of the first to eleventh features, wherein the first side wall component (35*az*1, 35*bz*1) is disposed on the side of the protrusion (55*a*, 55*b*) where the second frame (50) goes into the first frame (30).

With this lens barrel (3), since the first side wall component (35*az*1, 35*bz*1) is disposed on the side of the protrusion (55*a*, 55*b*) where the second frame (50) goes into the first frame (30), even if an external force is exerted on the second frame (50) in a state in which the second frame (50) has been deployed from the first frame (30), the protrusion (55*a*, 55*b*) will contact the first side wall component (35*az*1, 35*bz*1) and bear part of the external force. Therefore, the strength of the lens barrel (3) can be increased with this configuration.

INDUSTRIAL APPLICABILITY

The present invention is useful in the field of lens barrels.

REFERENCE SIGNS LIST

1 digital camera
2 housing
3 lens barrel
4 zoom motor
10 fixed frame
20 rectilinear frame
30 drive frame (an example of a first frame)
31 drive frame main body
32 gear component
34*a* first outer cam groove (an example of a cam groove, and an example of a groove)
34*az* first zoom component (an example of a zoom component)
34*b* second outer cam groove (an example of a cam groove, and an example of a groove)
34*bz* second zoom component (an example of a zoom component)
34*c* third outer cam groove (an example of a cam groove, and an example of a groove)
34*cz* third zoom component (an example of a zoom component)
35*a* first auxiliary groove (an example of an auxiliary groove, and an example of a groove)
35*az*1 first rear side wall component (an example of a first side wall component)
35*az*2 first front side wall component (an example of a first side wall component)
35*b* second auxiliary groove (an example of an auxiliary groove, and an example of a groove)
35*bz*1 second rear side wall component (an example of a second side wall component)
35*bz*2 second front side wall component (an example of a second side wall component)
40 intermediate frame
50 first lens frame (an example of a second frame)
51 first lens frame main body
54*a* first cam follower (an example of a cam follower, an example of a first cam follower, an example of a projection, and an example of a first projection)
54*b* second cam follower (an example of a cam follower, an example of a second cam follower, an example of a projection, and an example of a second projection)
54*c* third cam follower (an example of a cam follower, an example of a third cam follower, an example of a projection, and an example of a first projection)
55*a* first auxiliary pin (an example of a protrusion, an example of a first protrusion, an example of a projection, and an example of a third projection)
55*b* second auxiliary pin (an example of a protrusion, an example of a second protrusion, an example of a projection, and an example of a third projection)
60 second lens frame
70 third lens frame unit
80 fourth lens frame
90 master flange
G1 first lens group
G2 second lens group
G3 third lens group
G4 fourth lens group
GA aperture unit
GS shutter unit
GB blur correction unit
θ1 first angle (an example of a first angle)
θ2 second angle (an example of a second angle)
θ3 third angle (an example of a third angle)
θ4 fourth angle (an example of a fourth angle)
θ5 fifth angle (an example of a fifth angle)
θ6 sixth angle (an example of a sixth angle)
θ7 seventh angle (an example of a seventh angle)
P1*t* first telephoto position (an example of a telephoto position)
P1*w* first wide angle position (an example of a wide angle position)
P1*r* first recessed position P2t second telephoto position (an example of a telephoto position)
P2w second wide angle position (an example of a wide angle position)
P2r second recessed position
P3t third telephoto position (an example of a telephoto position)
P3w third wide angle position (an example of a wide angle position)
P3r third recessed position
C1, C2, C3 center axis (an example of the center axis of a cam follower)
C11, C12, C13 center axis (an example of the center axis of a protrusion)
D1 first reference point (an example of a first reference point)
D2 second reference point (an example of a second reference point)
D3 third reference point (an example of a third reference point)

The invention claimed is:

1. A lens barrel, comprising:
a first frame that is a substantially cylindrical frame and includes at least three cam grooves disposed spaced apart in a peripheral direction of the first frame, and at least one first side wall component disposed between adjacent ones of the cam grooves; and
a second frame configured to be rotatably supported by the first frame so as to have an axial direction in common with the first frame, the second frame including at least three cam followers and at least one protrusion, the at least three cam followers being configured to be inserted into the at least three cam grooves and guided along the at least three cam grooves respectively, and the at least three cam followers being configured to slidably contact the at least three cam grooves respectively, the at least one protrusion being configured to be movable along the at least one first side wall component and being configured to not contact the at least one first side wall component;
wherein a position of the at least one protrusion is offset from positions of the at least three cam followers in the axial direction,
wherein the position of the at least one protrusion is disposed more towards a positive side of the axial direction than the at least three cam followers, the positive side of the axial direction being towards a subject side;
the at least one first side wall component is shorter than the at least three cam grooves.

2. The lens barrel according to claim 1,
wherein the at least three cam followers include a first cam follower, a second cam follower, and a third cam follower,
the at least one protrusion includes a first protrusion and a second protrusion, and
when viewed in the axial direction, the first protrusion is disposed between the first cam follower and the second cam follower, and the second protrusion is disposed between the second cam follower and the third cam follower.

3. The lens barrel according to claim 2,
wherein a first angle between the first cam follower and the third cam follower is less than a second angle between the first cam follower and the second cam follower, and is less than a third angle between the second cam follower and the third cam follower.

4. The lens barrel according to claim 3,
wherein the first angle between the first cam follower and the third cam follower is greater than any one of a fourth angle between the first cam follower and the first protrusion, a fifth angle between the first protrusion and the second cam follower, a sixth angle between the second cam follower and the second protrusion, and a seventh angle between the second protrusion and the third cam follower.

5. The lens barrel according to claim 1,
further comprising an optical system including at least one lens,
wherein the at least three cam grooves have zoom components that guide the at least three cam followers from a telephoto position corresponding to a telephoto end of the optical system to a wide angle position corresponding to a wide angle end of the optical system, and
the at least one first side wall component is formed along a movement path traced by the at least one protrusion when the at least three cam followers are guided along the at least three cam grooves by the zoom components from the telephoto position to the wide angle position.

6. The lens barrel according to claim 5,
wherein the first frame has at least one auxiliary groove disposed between adjacent ones of the cam grooves,
the at least one auxiliary groove includes the first side wall component and a second side wall component disposed opposite the first side wall component, and
the at least one protrusion is inserted between the first side wall component and the second side wall component when the at least three cam followers are guided along the at least three cam grooves by the zoom component from the telephoto position to the wide angle position.

7. The lens barrel according to claim 6,
wherein a number of auxiliary grooves is less than a number of cam grooves.

8. The lens barrel according to claim 1,
wherein the at least one first side wall component is disposed on a side of the protrusion where the second frame goes into the first frame.

9. The lens barrel according to claim 1,
wherein the second frame has a first side from which light enters for passing through a lens, and
the at least one protrusion is disposed closer to the first side than the at least three cam followers.

10. The lens barrel according to claim 1,
wherein the first frame has a first side from which light enters for passing through a lens and a second side opposite to the first side, and
the at least one first side wall component is disposed closer to the second side than an end portion of any of the at least three cam grooves on the first side.

* * * * *